United States Patent [19]
Knowlton et al.

[11] Patent Number: 5,742,975
[45] Date of Patent: Apr. 28, 1998

[54] ARTICULATED FLOOR SCRUBBER

[75] Inventors: Christopher M. Knowlton, Pinehurst, N.C.; Robert J. O'Hara, Castle Rock, Colo.

[73] Assignee: Windsor Industries, Inc., Englewood, Colo.

[21] Appl. No.: 643,471

[22] Filed: May 6, 1996

[51] Int. Cl.$^6$ .................................................. A47L 11/293
[52] U.S. Cl. ..................... 15/320; 15/340.1; 15/340.3; 280/771; 280/775
[58] Field of Search ................................. 15/320, 340.1, 15/340.2, 340.3, 340.4; 280/771, 775

[56] References Cited

U.S. PATENT DOCUMENTS

| | | | |
|---|---|---|---|
| 3,277,511 | 10/1966 | Little et al. | 15/340.3 |
| 3,395,930 | 8/1968 | Morgan | 280/775 |
| 3,439,937 | 4/1969 | Dixon . | |
| 3,942,218 | 3/1976 | Krier et al. . | |
| 4,023,434 | 5/1977 | Axelsson | 280/771 |
| 4,317,252 | 3/1982 | Knowlton . | |
| 4,320,556 | 3/1982 | Kimzey et al. | 15/340.3 |
| 4,378,855 | 4/1983 | Haub et al. | 15/340.4 |
| 4,401,408 | 8/1983 | Gibert . | |
| 4,492,002 | 1/1985 | Waldhauser et al. | 15/320 |
| 4,787,646 | 11/1988 | Kamlukin et al. . | |
| 5,623,743 | 4/1997 | Burgoon et al. | 15/320 |

*Primary Examiner*—Terrence Till
*Attorney, Agent, or Firm*—Sheridan Ross P.C.

[57] ABSTRACT

The present invention provides an articulated vehicle for scrubbing floors that provides an operator station for riding on the vehicle and is particularly useful in cleaning relatively large floor surfaces that are defined by intersecting aisles of relatively narrow width. In this regard, the dimensional characteristics of the vehicle body facilitate tight turns in such aisles. Further, the location and/or shape of components of the vehicle and/or the positional relationship of one component to another component facilitate turns in narrow aisles. The vehicle also incorporates shock absorbing systems for the scrub head and vacuum squeegee that benefit the noted application.

76 Claims, 19 Drawing Sheets

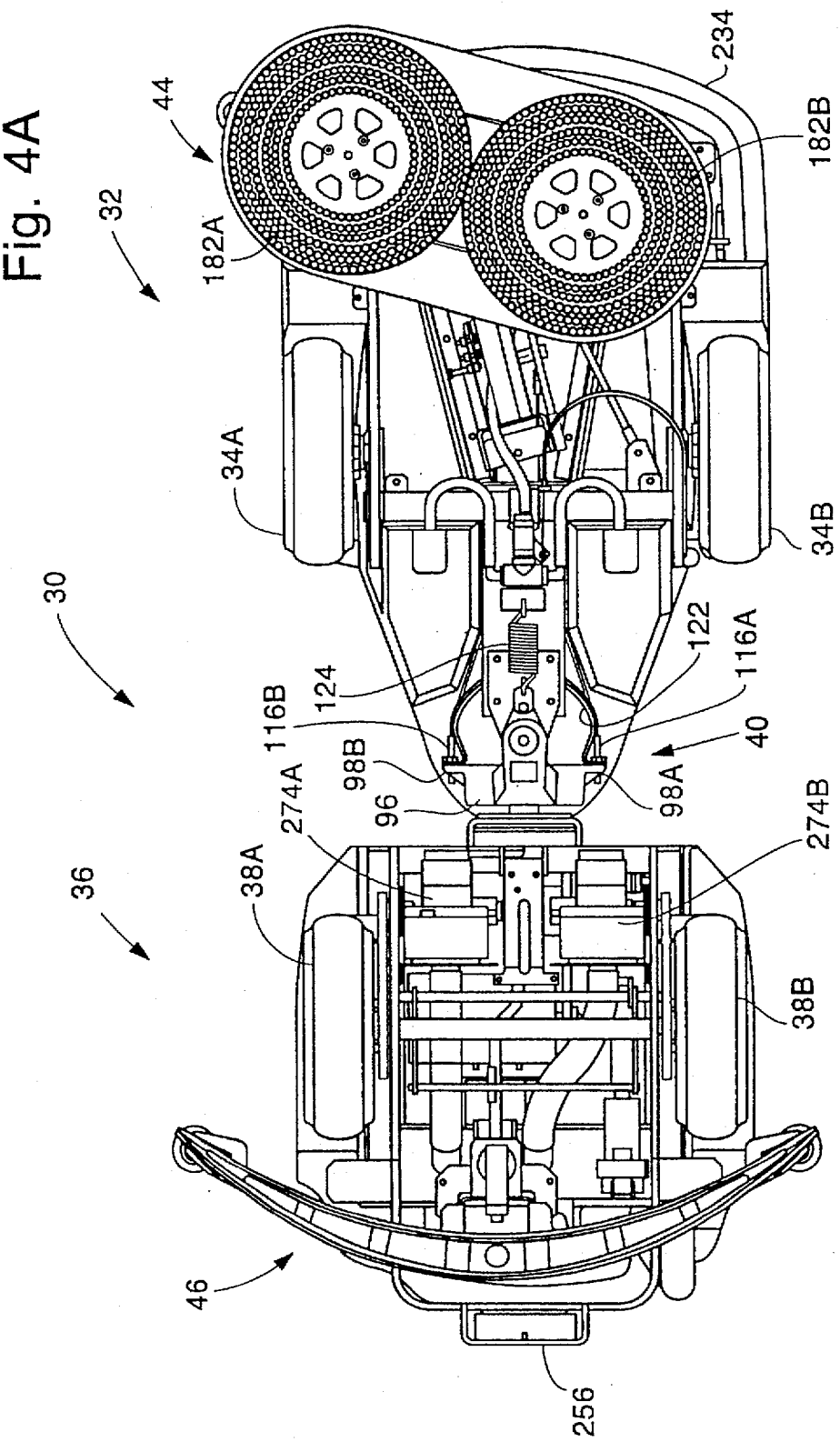

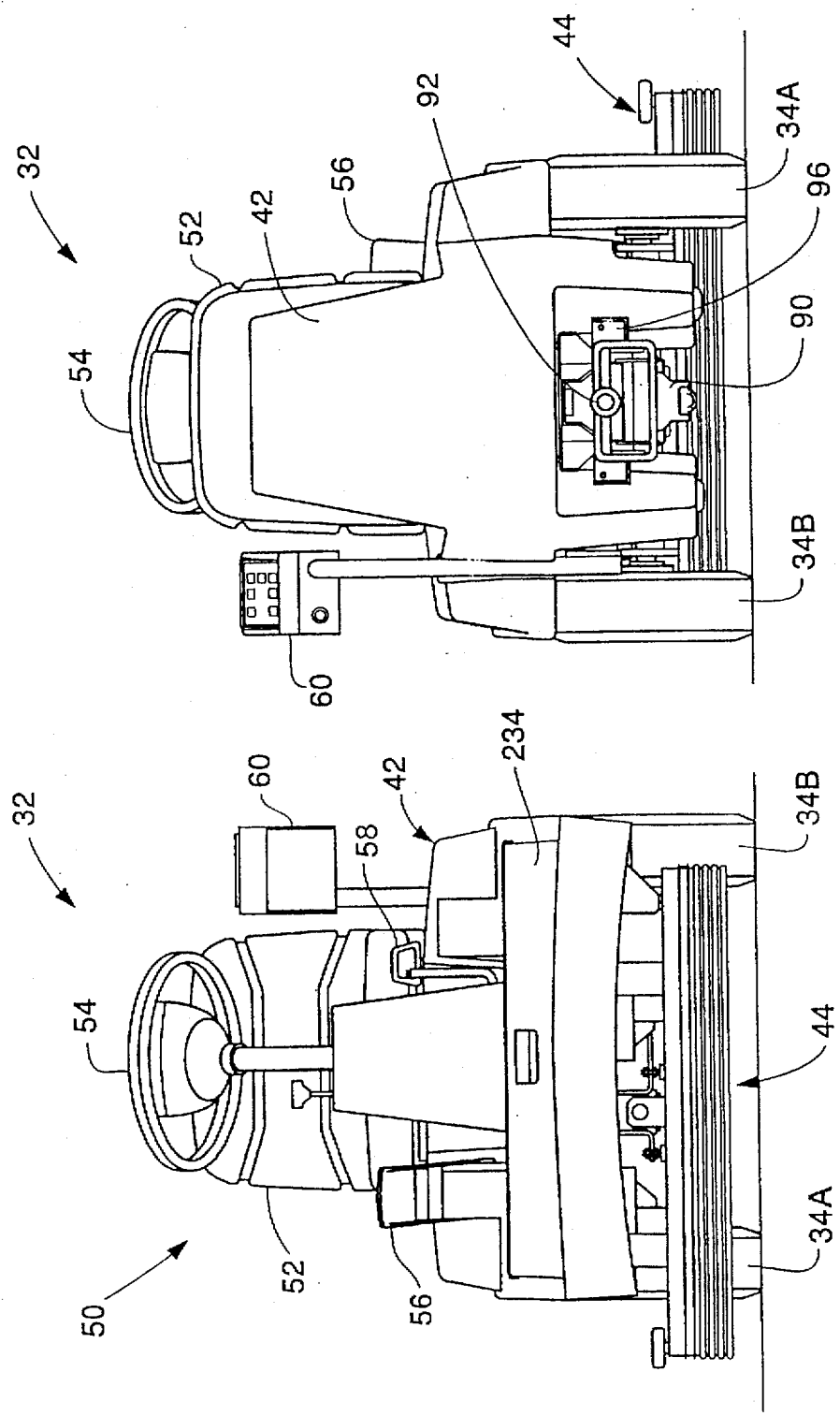

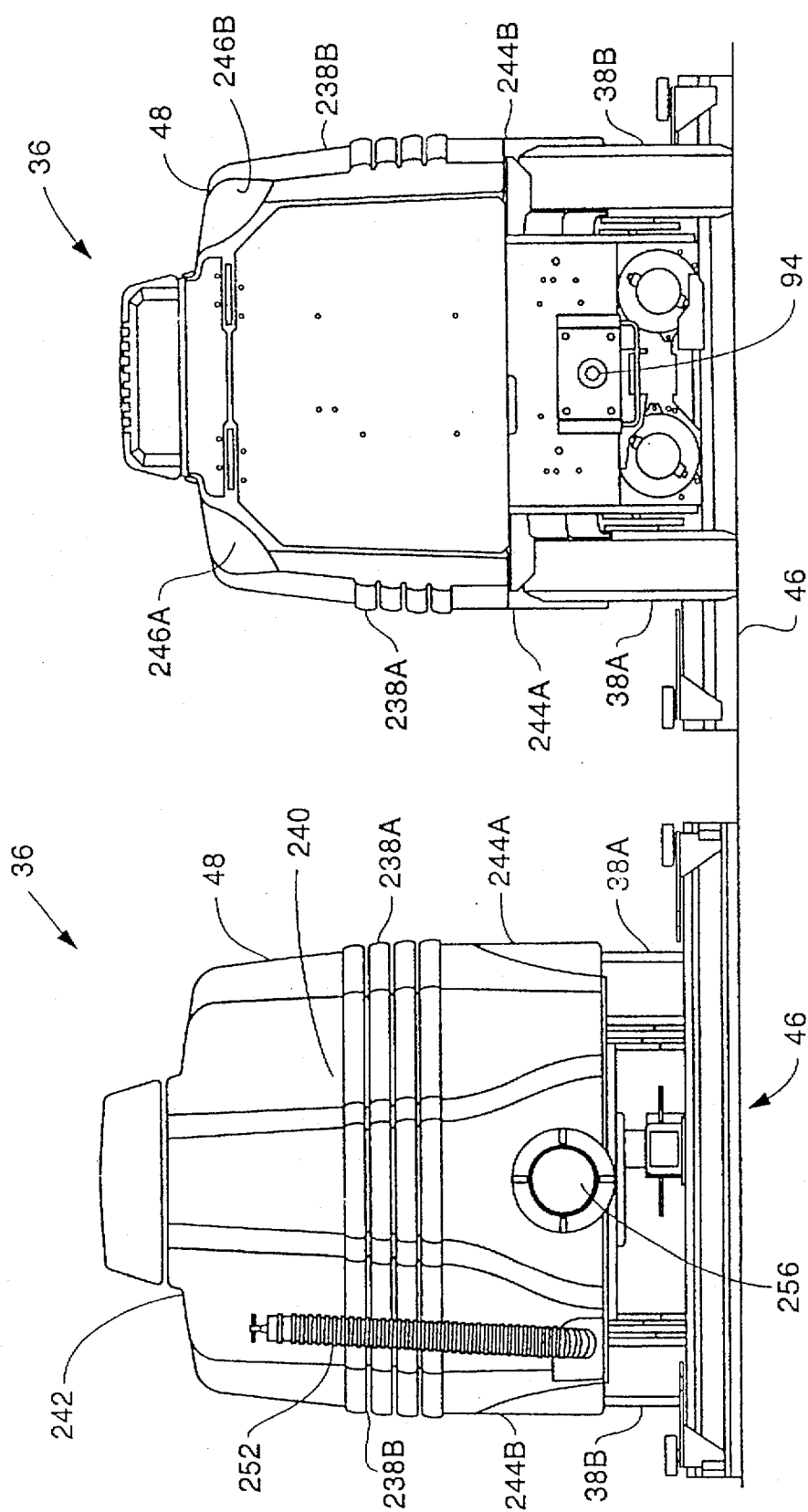

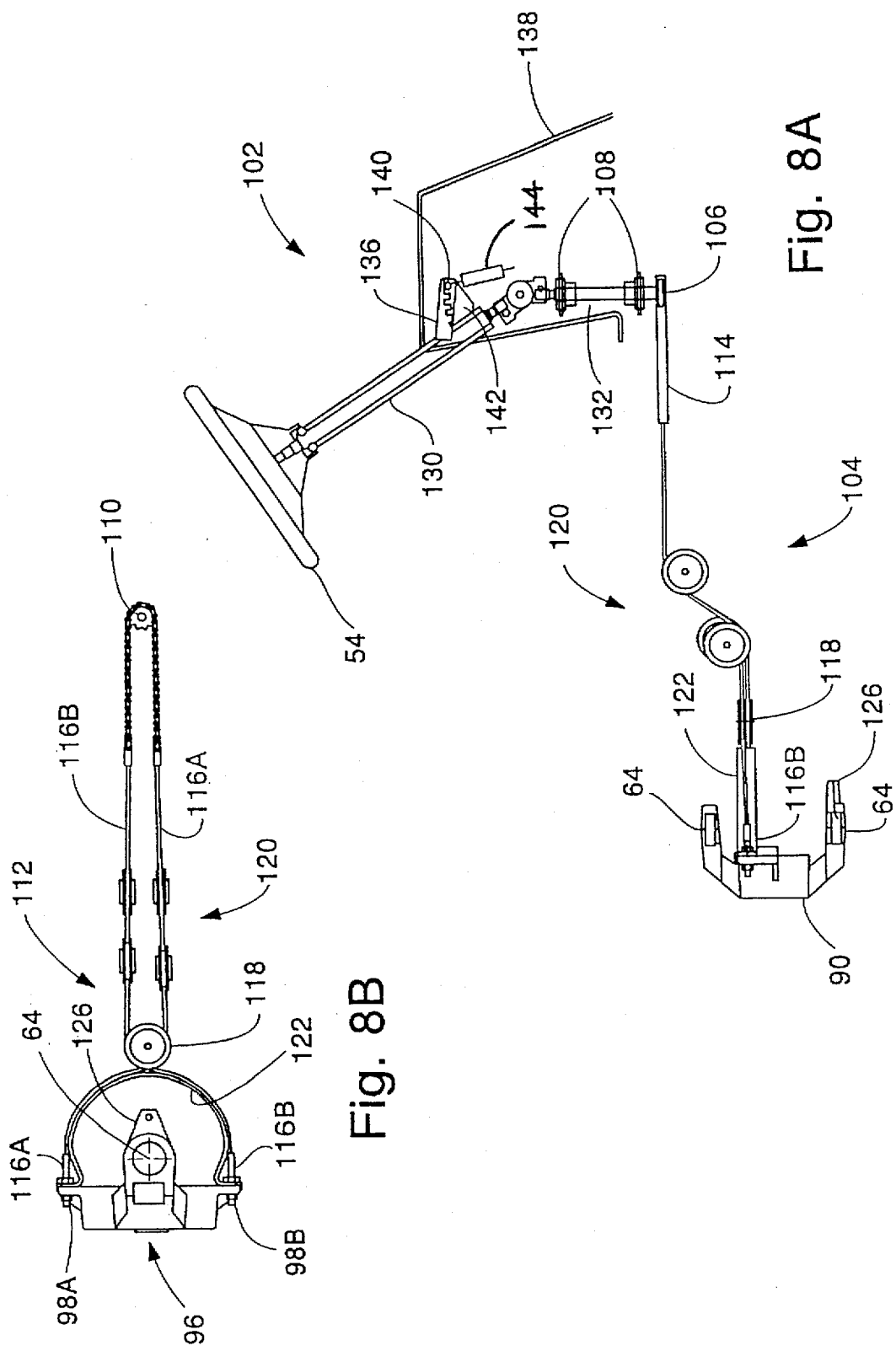

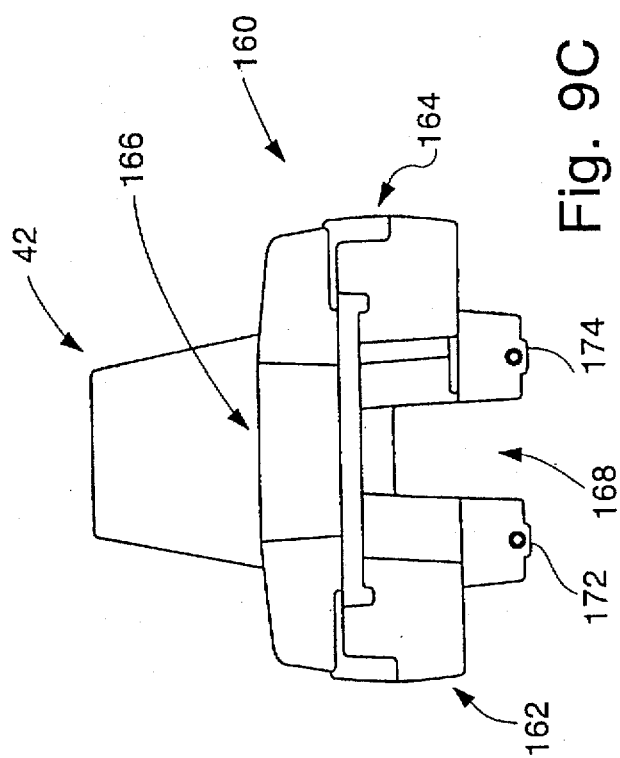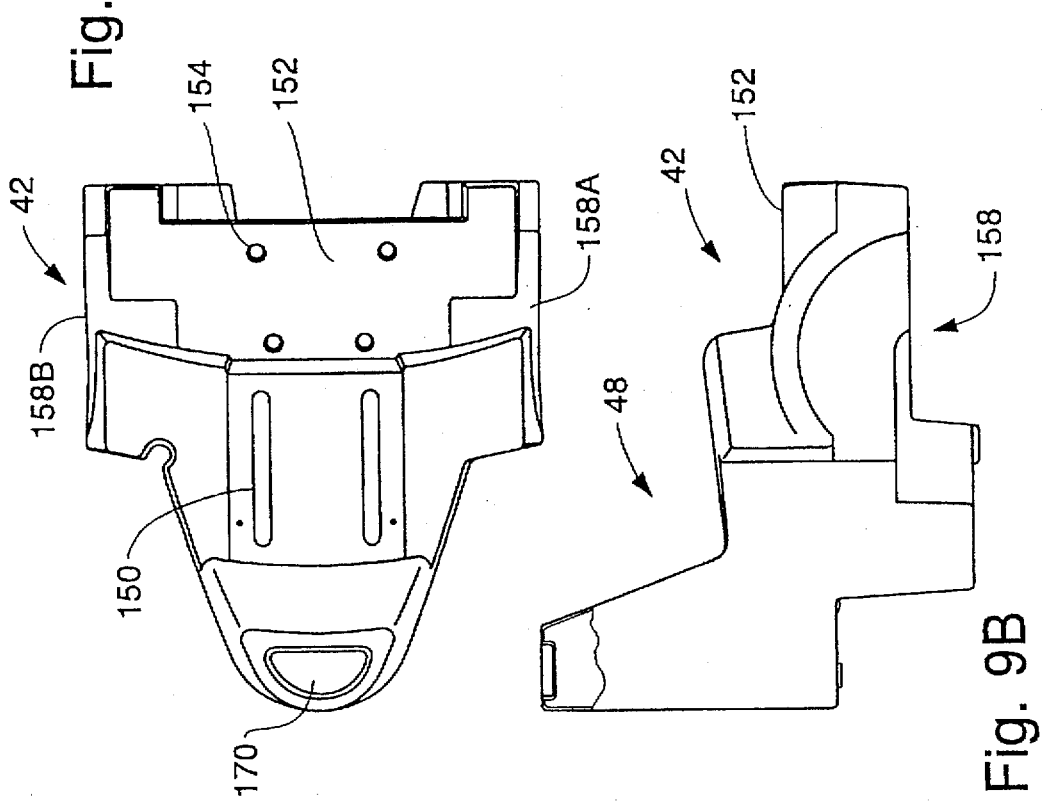

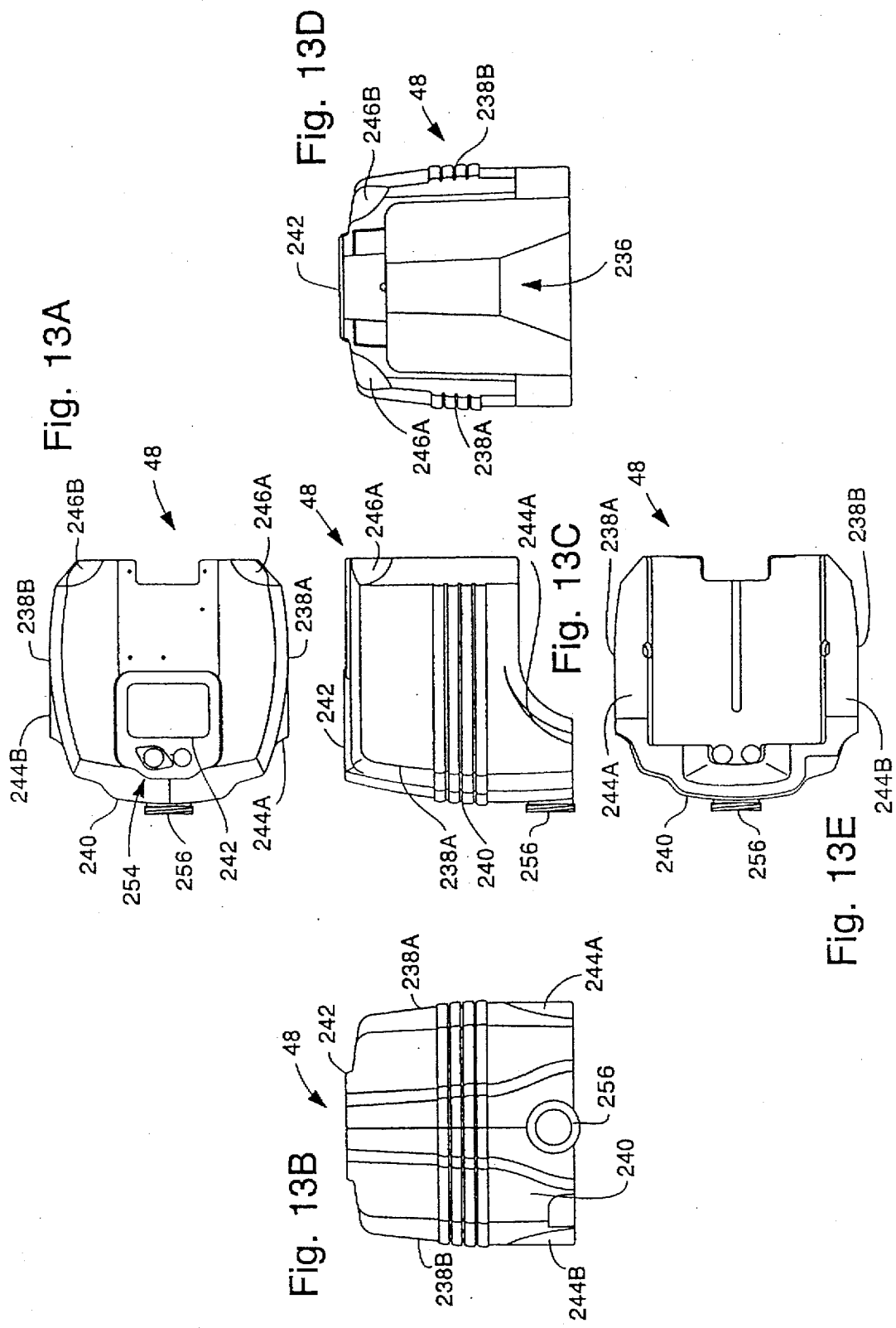

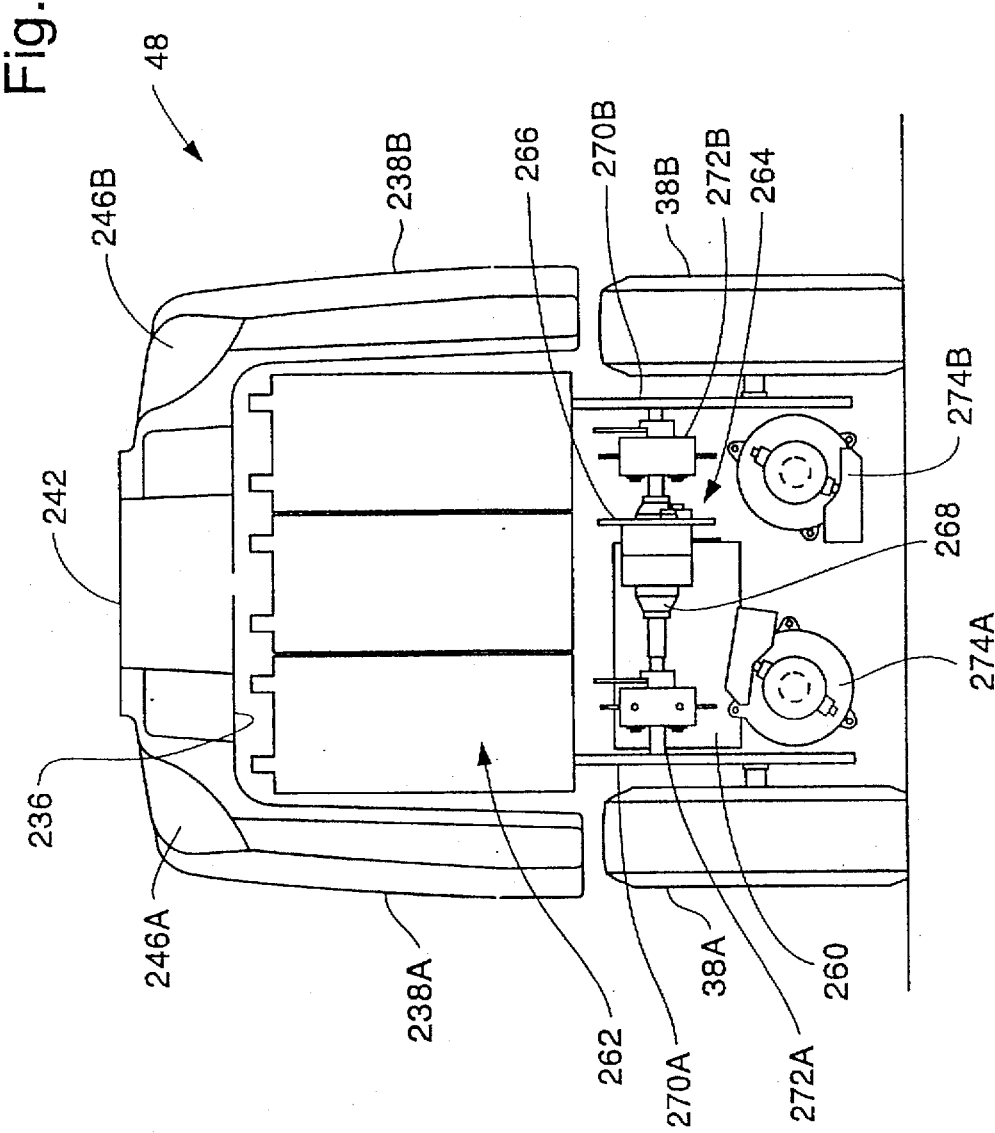

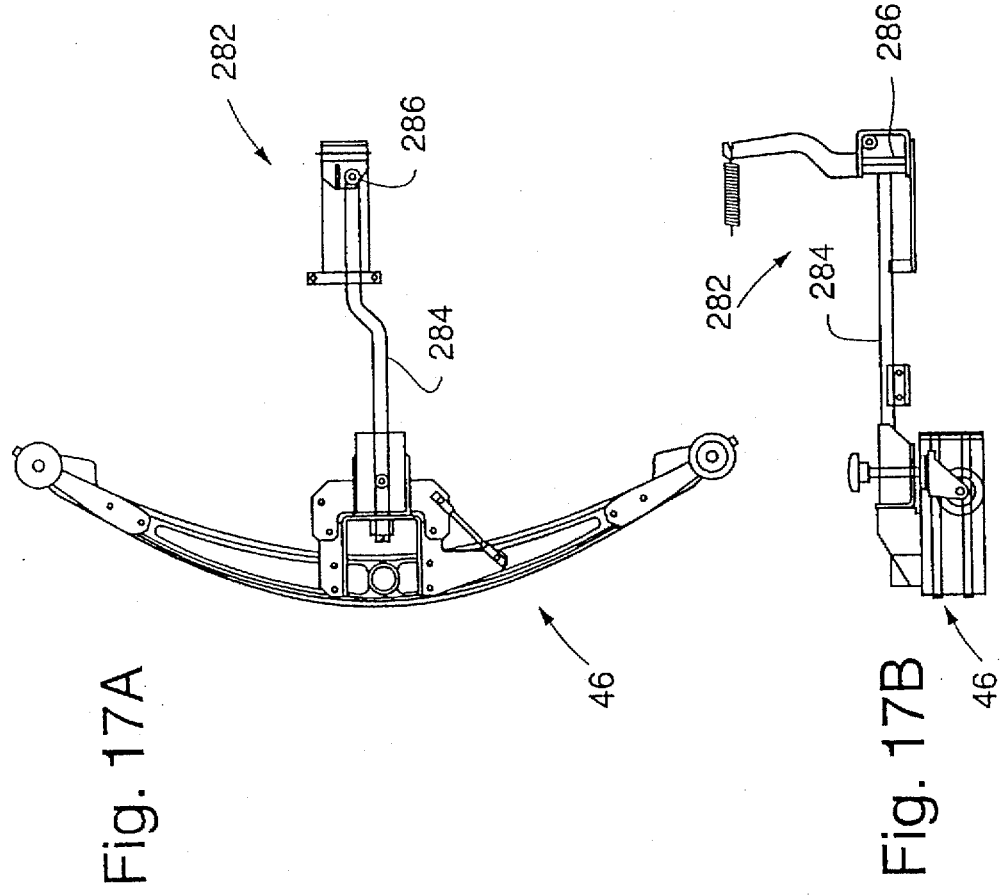

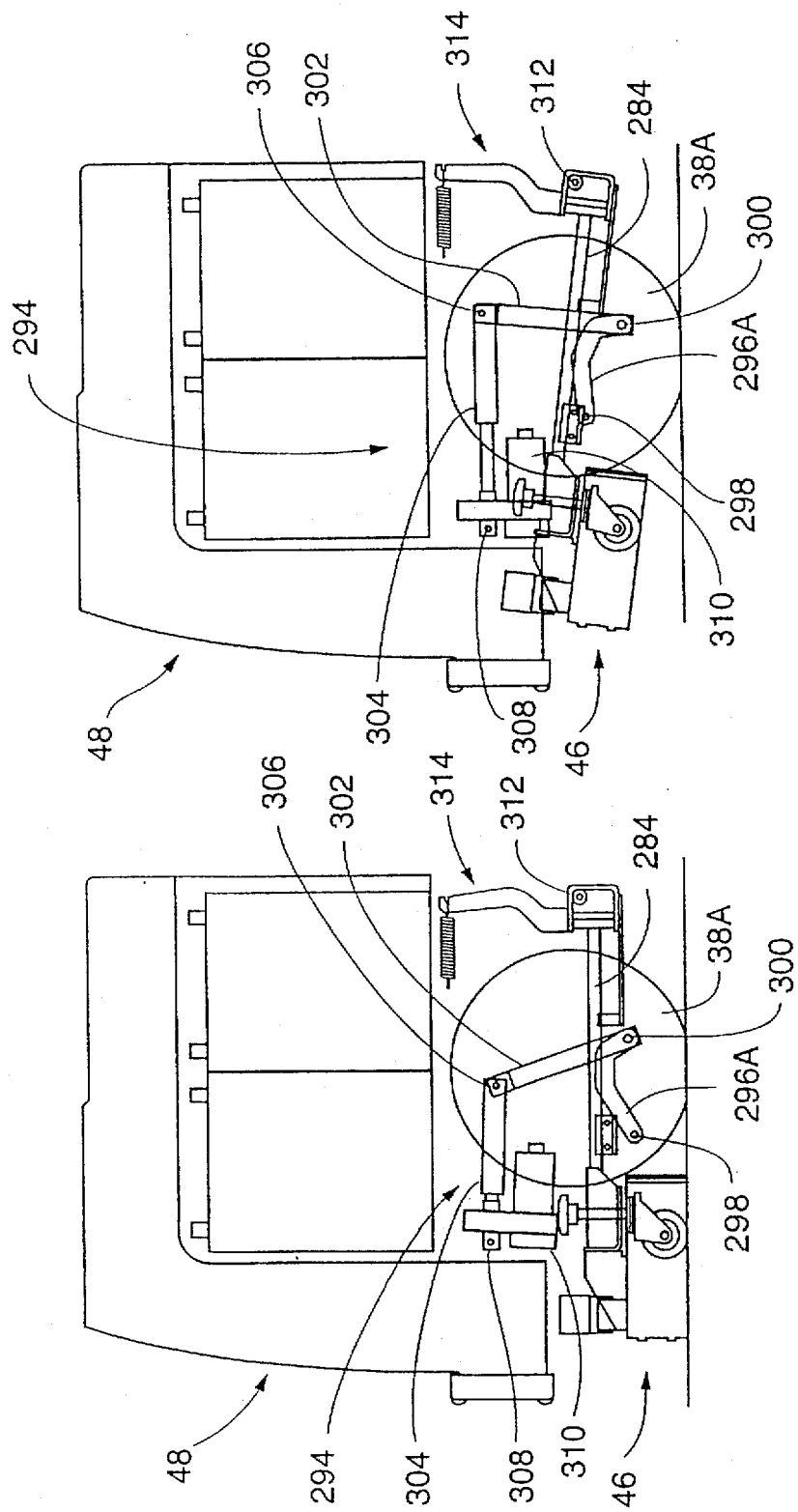

ARTICULATED FLOOR SCRUBBER

FIELD OF THE INVENTION

The present invention relates to cleaning apparatuses and, in particular, to scrubbers that are used to clean floors.

BACKGROUND OF THE INVENTION

Industrial floor scrubbers are of two types in terms of the location of the operator. In the first type, the operator walks behind a scrubber vehicle and performs steering and other scrubber operations via a user interface located on the rear of the vehicle. This type of scrubber generally exhibits a high degree of maneuverability. However, the speed with which such a scrubber can clean a floor is limited to the walking speed of the operator. Moreover, operator fatigue limits the time of operation of such a scrubber. Due to the noted speed and time limitations, the amount of floor space that can be scrubbed in any given period of time is limited. Consequently, such scrubbers are particularly well suited to applications involving a relative small amount of floor surface and requiring a high degree of maneuverability.

In the second type of floor scrubber, the operator is stationed on the scrubber vehicle, typically in a seat, and performs steering and other scrubber operations via an interface located adjacent to the operator station. This type of scrubber is typically used in applications involving large open floor areas or large floor areas defined by broad aisles, such as factories and airplane hangers, in which it would be impractical to use the first type of scrubber. Since this type of scrubber is particularly adapted to large open floor applications, it generally does not exhibit, nor is it required to have a high degree of maneuverability.

A recent development in the industrial/commercial work space is the advent of the "super store", which is characterized by a large floor surface area defined by relatively narrow aisles. Neither of the two noted types of present scrubbers are well adapted to such an application. Specifically, the first type of scrubber, i.e., the walk-behind scrubber, is not well adapted to processing large surface areas, particularly if the time during which the scrubber can be used to clean the floor is limited. The second type of scrubber, i.e., the riding scrubber, while able to process large floor areas, does not exhibit the maneuverability needed for the noted application.

Based on the foregoing, there is a need for a floor scrubber that can address applications involving large floor areas defined by relatively narrow aisles.

SUMMARY OF THE INVENTION

The present invention provides a vehicle for scrubbing floors that is particularly well suited to applications that involve relatively large floor surfaces defined by relatively narrow aisles.

To address this application, an articulated vehicle that has particular dimensional constraints and an operator station for accommodating a riding operator is provided by the present invention. Consequently, the present invention addresses the deficiencies of the two noted types of scrubbers in such applications, i.e., the limitations associated with an operator in the first type of scrubber and the lack of maneuverability in the second type of scrubber.

The articulated scrubber of the present invention also addresses the noted application by placing components in certain locations, such as on the front portion or rear portion of the vehicle. Similarly, many components have particular shapes that benefit the noted application. Furthermore, the orientation of one component to one or more other components contributes to achieving a scrubber having a high degree of functionality in the noted application. For instance, the solution tank used to provide the cleaning solution applied to the floor and the recovery tank used to retain cleaning solution recovered from the floor after scrubbing are respectively associated with the front portion and rear portion of the vehicle in the preferred embodiment of the invention. The solution tank is also shaped to make efficient use of space. For example, in the preferred embodiment, the solution tank includes a seat shaped portion to which an operator seat is mounted and a portion shaped to serve as a wheel well. Exemplary of the relative orientation of several components is the placement of an electric motor for providing drive power to a wheel, the battery for providing electricity to the motor, and a portion of the recovery tank at respectively increasing distances from the floor in the preferred embodiment of the invention. Other locational, shape, orientations of one component to another component, and combinations thereof are also present in the invention.

The present invention also provides a shock absorbing system for a scrub head that addresses the positional relationship of a scrub head to one of the wheels of the scrubber in accommodating the noted application. More specifically, the scrub head has a first end that protrudes beyond the body of the scrubber and a second end that lies underneath the scrubber and adjacent to one of the wheels. Occasionally, a wall or similar structure contacts the exposed first end of the scrub head. To absorb the shock in a manner that avoids contact between the second end of the scrub head and the adjacent wheel, the present invention provides a shock absorbing system that moves the second end of the scrub head away from the wheel. Specifically, the shock absorbing system, upon a shock being applied to the first end of the scrub head, applies a force that moves the second end of the scrub head forward, i.e., towards the front of the vehicle, to avoid the noted wheel. In a related aspect, the lift mechanism used to raise and lower the scrub head accommodates shocks applied to scrub head by rotating about a pivot point, which is preferably implemented with a gimbal.

The present invention also provides a shock absorbing system for a squeegee associated with the rear portion of the articulated vehicle and with an end that extends beyond the body of the vehicle, thereby making the squeegee susceptible to contact with a wall or like structure. The shock absorbing system operates to hold the squeegee in a fixed orientation relative to the rest of the rear portion of the vehicle during normal operation, i.e., when a lateral force or a shock is not being applied to the squeegee. When a lateral force is applied to the squeegee, the shock absorbing system releases the squeegee from its fixed orientation, thereby permitting the squeegee to "float". In the preferred embodiment, a rod is attached to the squeegee and held in the fixed orientation by a notched block. Upon application of the lateral force to the squeegee, the rod is displaced from the notch and the squeegee is free to float.

BRIEF DESCRIPTION OF THE DRAWINGS

FIG. 4A is a bottom view of the floor scrubber of the present invention;

FIG. 5A is a front view of the front portion of the articulated floor scrubber of the present invention;

FIG. 5B is a rear view of the front portion of the articulated floor scrubber of the present invention;

FIG. 6A is a front view of the rear portion of the articulated floor scrubber of the present invention;

FIG. 6B is a rear view of the rear portion of the articulated floor scrubber of the present invention;

FIG. 8A is a side view of a free body diagram of the steering mechanism utilized in the articulated floor scrubber of the present invention;

FIG. 8B is a top view of a free body diagram of the steering system illustrated in FIG. 8A with the steering column portion thereof removed;

FIGS. 9A, 9B and 9C respectively are top, right side and front views of the solution tank employed in the articulated floor scrubber of the present invention;

FIGS. 13A, 13B, 13C, 13D and 13E are respectively a top view, end view, right side view, front view, and bottom view of the recovery tank employed in the articulated floor scrubber of the present invention;

FIGS. 14A and 14B illustrate the positional relationship between various components located in the rear portion of the articulated floor scrubber and, in particular, the relative positional relationships between the recovery tank, the electric motor, and the batteries for providing electricity to the electric motor;

FIGS. 17A and 17B respectively are top and side views of a free body diagram illustrating the mechanism used to process lateral shock forces applied to the vacuum squeegee;

FIG. 17C illustrates the notched block employed in the mechanism for processing lateral shock forces applied to the vacuum squeegee; and FIGS. 18A and 18B illustrate the mechanism for raising and lowering the vacuum squeegee relative to the floor.

DETAILED DESCRIPTION OF THE PREFERRED EMBODIMENT

Figure 1:
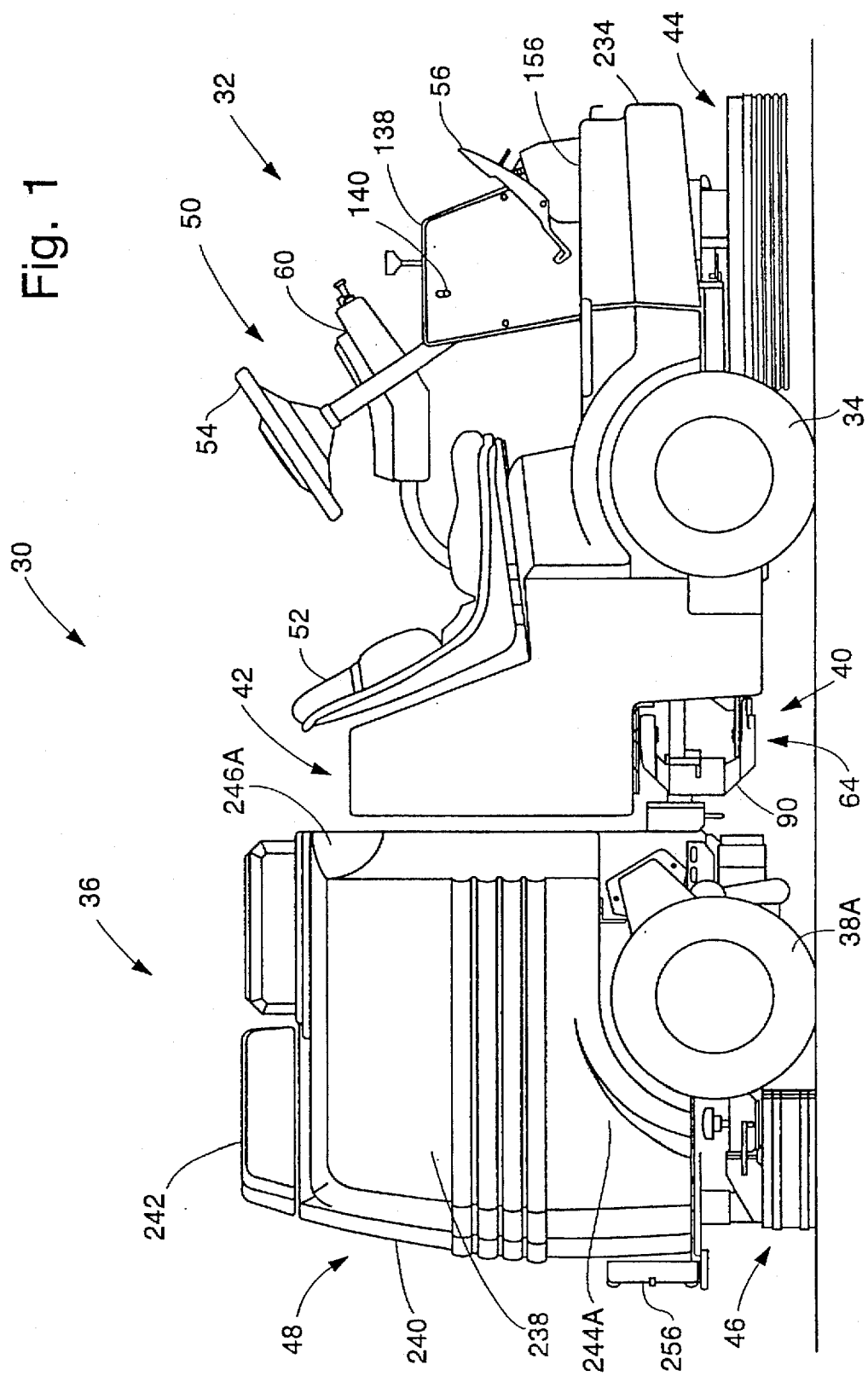
FIG. 1 is a right side view of the articulated floor scrubber of the present invention.
Figure 2:
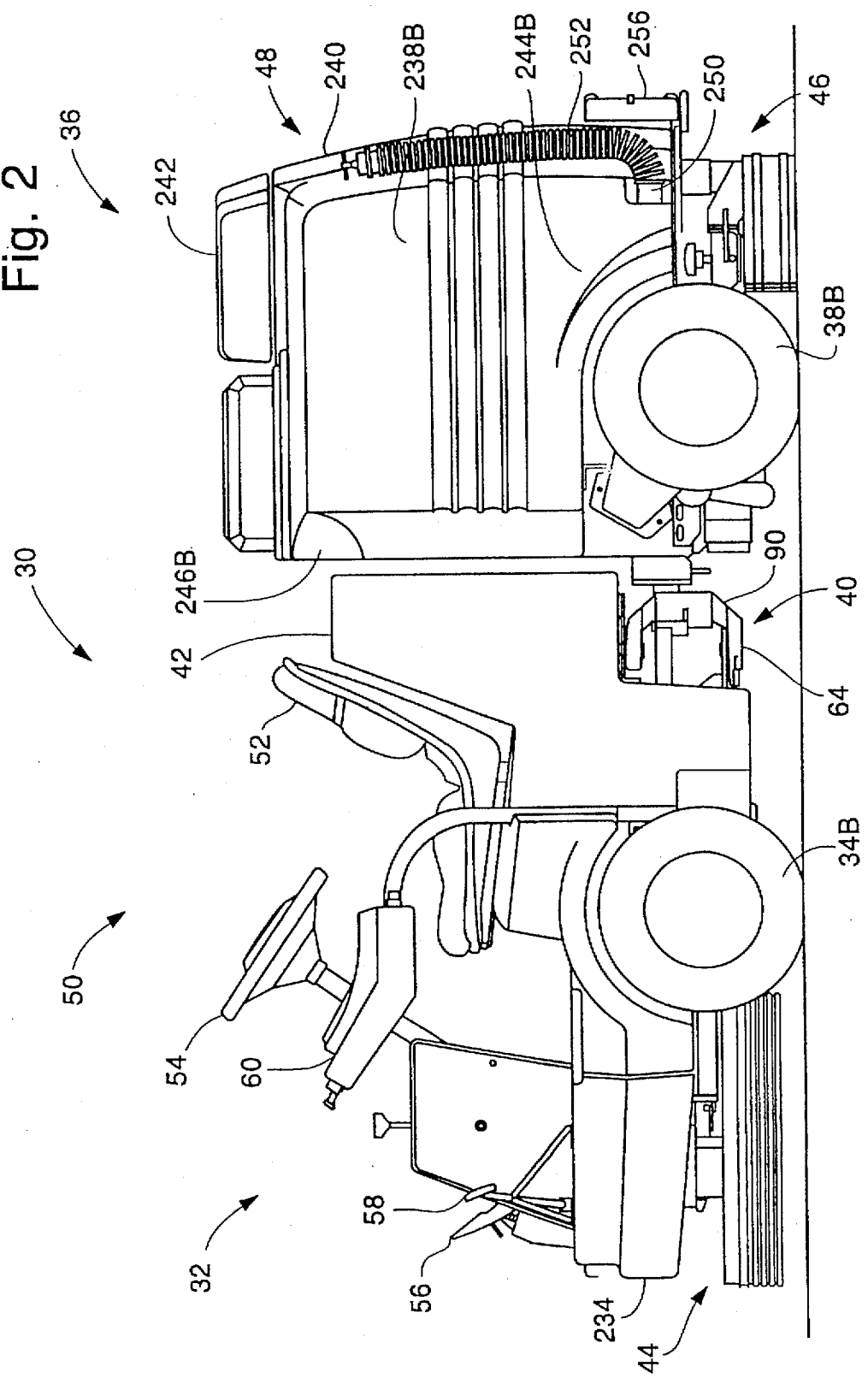
FIG. 2 is a left side view of the articulated floor scrubber of the present invention.
Figure 3:
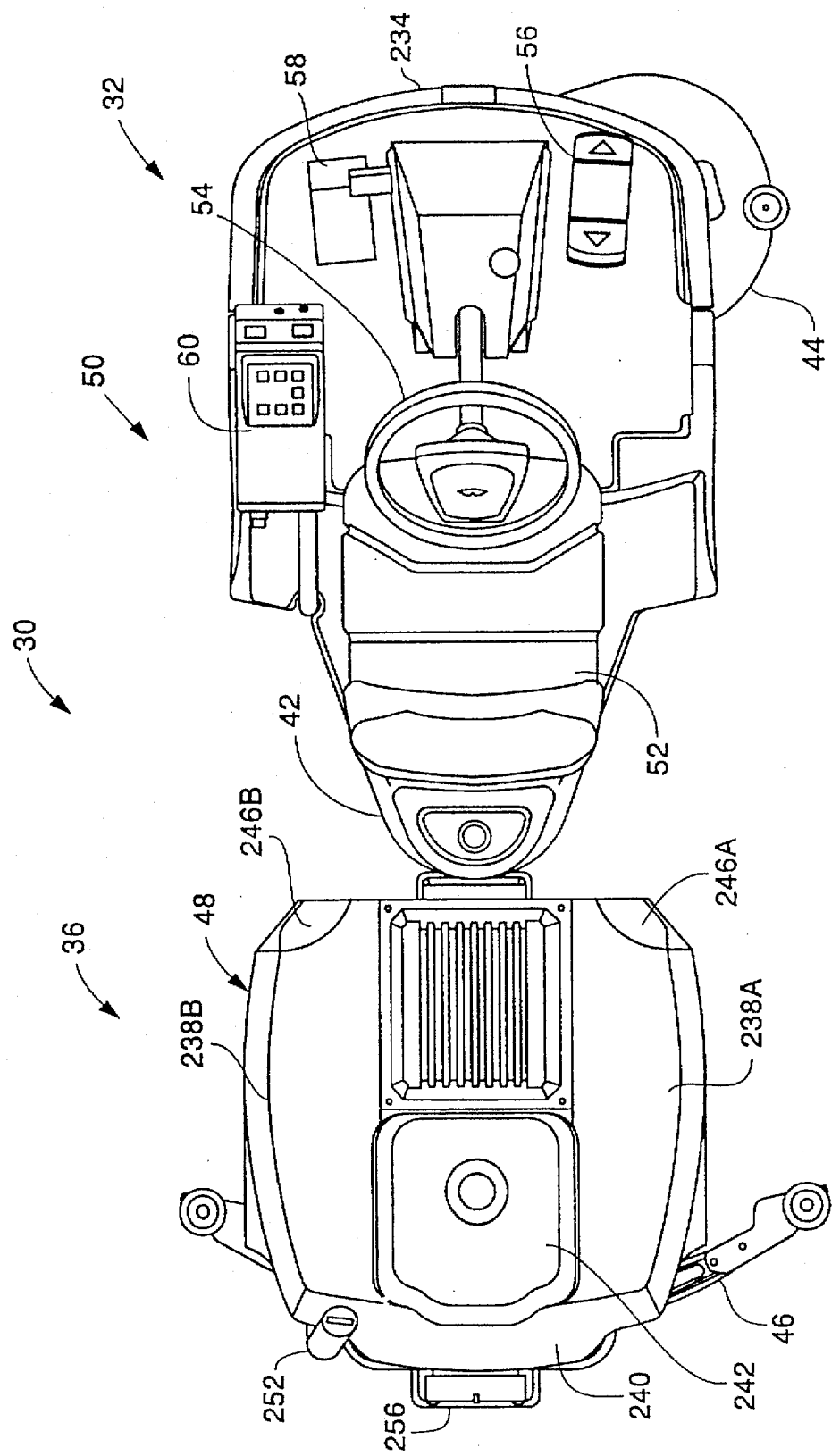
FIG. 3 is a top view of the floor scrubber of the present invention.

With reference to FIG. 1 through FIG. 6B, the present invention is directed to an articulated vehicle 30, hereinafter vehicle 30, for use in scrubbing relatively large floor spaces, typically on the order of 60,000 to 120,000 square feet, that are defined by relatively narrow aisles, typically on the order of 46 inches in width. Further, the vehicle 30 accommodates an operator on the vehicle.

Generally, the vehicle 30 employs an articulated steering architecture for achieving a tight turning radius. In this regard, the vehicle 30 includes a front portion 32 that is supported by a front pair of wheels 34A, 34B, both of which are non-steerable. Similarly, the vehicle 30 also includes a rear portion 36 that is supported by a rear set of wheels, 38A, 38B, both of which are also non-steerable. The front portion 32 is connected to the rear portion 36 by a pivotal connection structure 40. Steering of the scrubber is achieved with a steering mechanism that manipulates the pivotal connection 40 to "scissor" the front and rear portions 32, 36, relative to one another and thereby turn the vehicle 30. Another characteristic of an articulated steering architecture is that all of the wheels associated with each of the vehicle portions cannot, without the support of the wheels associated with the other portion, facilitate rolling movement of the portion with which the wheels are associated. In the context of the vehicle 30, this means that if the front portion 32 were disconnected from the rear portion 36, the front portion 32 would tip one way or the other so that the front portion would not roll on the wheels 34A, 34B in the absence of some force lifting the end of the front portion that had tipped and was in contact with the floor. A similar statement can be made with respect to the rear portion 36.

The vehicle also generally includes a drive system for selectively applying drive power to one or more wheels, a braking system, and a steering system, as previously mentioned, for manipulating the pivotal connection structure 40.

The vehicle 30 also includes a number of basic scrubbing elements including a solution tank 42 that provides a cleaning solution which is used in scrubbing the floor. Another of the basic scrubbing elements is a scrub head 44 that is used to scrub the floor and is comprised of a brush assembly and a motor assembly that drives the brush assembly. A vacuum squeegee 46 and recovery tank 48 constitute the remaining primary scrubbing elements. The vacuum squeegee 46 operates to remove cleaning solution from the floor after the scrubbing is done by the scrub head 44. Cleaning solution removed by the vacuum squeegee 46 is transported to, and retained by the recovery tank 48 for later disposal or recycling.

An operator station 50 is provided for accommodating an operator on the vehicle. Operator interfaces of the steering system, drive power system, braking system and various elements comprising the scrubbing system are located in the operator station. More specifically, the operator station 50 includes a seat 52, a steering wheel 54, a forward/reverse accelerator pedal 56, a brake pedal 58 and a control panel 60.

The dimensional aspects of the vehicle 30 are now discussed and, in particular, the length characteristics of the vehicle 30 when used to scrub aisles of 46 inches in width, the narrowest width presently found in the 60,000 to 120,000 square foot commercial buildings in which the vehicle 30 is to operate. It should, however, be appreciated that the dimensions noted hereinafter can be modified to accommodate aisles of different widths.

Figure 7:
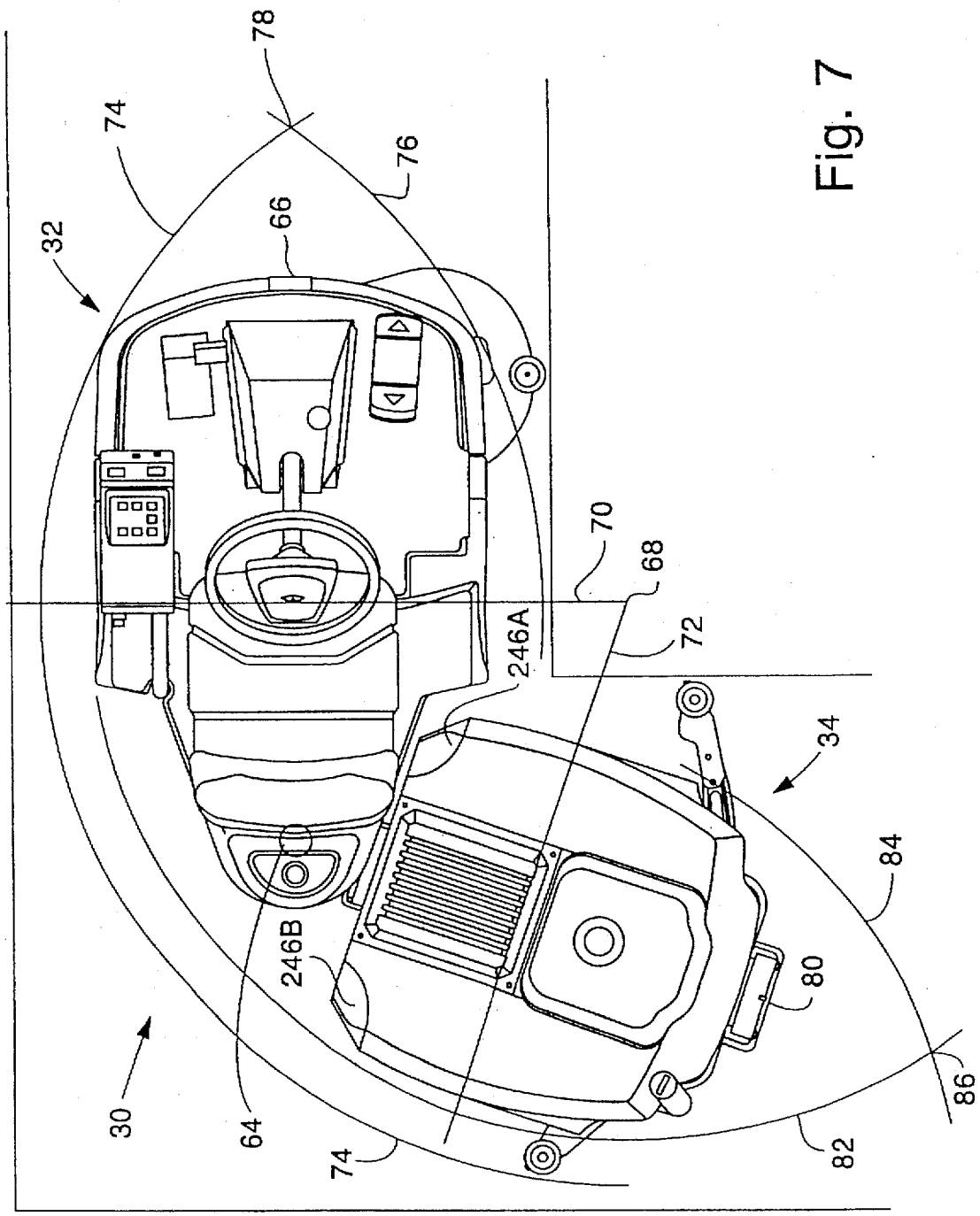
FIG. 7 illustrates the articulated floor scrubber of the present invention turning from a first aisle into a second aisle, each aisle having a relatively narrow width.

The length dimensions of the vehicle 30 are discussed with respect to FIG. 7, which illustrates the vehicle 30 turning from a first aisle into a second aisle that is perpendicular to the first aisle, with each aisle having a width of approximately 46 inches. The vehicle 30 is also shown turning with the maximum vehicle articulation of 71°. The length of the front portion 32 is measured from the pivot point 64 associated with the pivotal connection structure 40 to the front most point 66 of the front portion 32 of the vehicle 30. In the illustrated embodiment, the length of the front portion 32 is approximately 50 inches. The maximum possible length for the front portion 32 is determined by the squeegee length, which is slightly less than the aisle width of 46 inches. More specifically, when the vehicle is in a turn as shown, a center 68 is defined by the convergence of a first common axis of rotation 70 for the front wheels 34A, 34B, and a second common axis of rotation 72 for the rear wheels 38A, 38B. A first arc 74 having a radius that extends from the center 68 to the end of the vacuum squeegee 46 and a second arc 76 that is a mirror of the first arc converge at a maximum front length point 78, which is approximately 62 inches from the pivot point 64. The first and second arcs 74, 76 also define the envelope that the front portion 32 must fit within in order to service aisles 46 inches in width.

The length of the rear portion is measured from the pivot point 64 to the rearmost point 80 on the rear portion 36 of the vehicle 30. In the illustrated embodiment, the length of the rear portion is approximately 43 inches. The maximum possible length for the rear portion 36 is determined by the aisle width of 46 inches. More specifically, a first rear arc 82 having a radius that extends from the center 68 to a length that is substantially equal to the aisle width and a second rear arc 84 that is a mirror of the first rear arc converge at a maximum rear length point 86, which is approximately 57 inches from the pivot point 64. The first and second rear arcs 82, 84 also define the envelope that the rear portion 36 must fit within in order to service an aisle 46 inches in width.

Based on the foregoing, the vehicle 30 has an overall length of approximately 93 inches that could be increased to a maximum overall length of approximately 120 inches.

The width of the front portion 32 is approximately 34 inches to allow the vehicle 30 to pass through, with the scrub head 44 removed or retracted, the narrowest door found in the application in which the vehicle 30 is to operate. Likewise, the width of the rear portion 32 is also about 34 inches with the vacuum squeegee 46 removed to accommodate entry through the noted door.

The height of the vehicle 30 is also of concern because of the relative narrow width of the vehicle 30. To elaborate, given the width of the vehicle, it is desirable to keep the height of the vehicle 30 low relative to the floor to reduce the possibility of the vehicle 30 tipping over during turns. The maximum height of the front portion 32 occurs at the top of the steering wheel 54 and is approximately 45 inches from the floor. The top of the solution tank 42 is approximately 36 inches from the floor. The maximum height of the rear portion 36 of the vehicle 30 occurs at the top of the recovery tank 48 and is also approximately 45 inches from the floor.

The length, width and height constraints imposed on the vehicle 30 by the application affected the orientation and/or shape of a number of components and/or the positional relationship of one component to another component as more fully described hereinafter. However, before describing these aspects of the invention, the pivotal connection structure 40 and steering system associated therewith is described.

With reference to FIGS. 8A and 8B, the pivotal connection structure 40 is comprised of a yoke 90 that is pivotally attached to the frame of the front portion 32 so as to pivot about the pivot point 64. The yoke 90 includes a receptacle 92 (FIG. 5B) for receiving a pin 94 (FIG. 6A) to fixedly connect the rear portion 36 to the yoke 90. An armature 96 extends horizontally from the yoke 90 to define a first armature end 98A disposed to one side of the pivot point 64 and a second armature end 98B disposed to the opposite side of the pivot point 64 relative to the longitudinal axis of the vehicle 30. The armature 96 is the structure to which the steering system applies torque in order to articulate the front and rear portions 32, 36 relative to one another and thereby turn the vehicle 30.

The steering system, as previously mentioned, includes a steering wheel 54. Also generally included in the system is a steering column 102 that connects the steering wheel 54 to the armature 96 via a steering linkage 104. More specifically, the steering column 102 extends from the steering wheel 54 to a steering column end 106 and is supported by a bearing assembly 108. The steering linkage 104 is comprised of a gear 110 that is attached to the steering column end 106. The gear 110, in turn, engages a cable 112 and, more specifically, a chain portion 114 of the cable 112 that is located substantially mid-way between a first end of the cable 116A and a second cable end 116B. The terminal portions of the first and second cable ends 116A, 116B are respectively connected to the first and second armature ends 98A, 98B. A dual groove pulley 118 serves to cross the first and second cable ends 116A, 116B so that when the steering wheel is rotated in a clockwise direction, the front portion 32 turns to the right relative to the rear portion 36 and when the steering wheel 54 is turned in a counter clockwise direction, the front portion 32 turns to the left relative to the rear portion 36. The steering system further includes two pairs of pulleys 120 to translate the first and second cable ends 116A, 116B around other components comprising the front portion 32 of the vehicle 30. Additionally, a curved band 122 is employed to direct the terminal portions of the first and second cable ends 116A, 116B so that each is substantially perpendicular to the first and second armature ends 98A, 98B, thereby facilitating connection of the cable 112 to the armature 96 by conventional means.

Figure 4B:
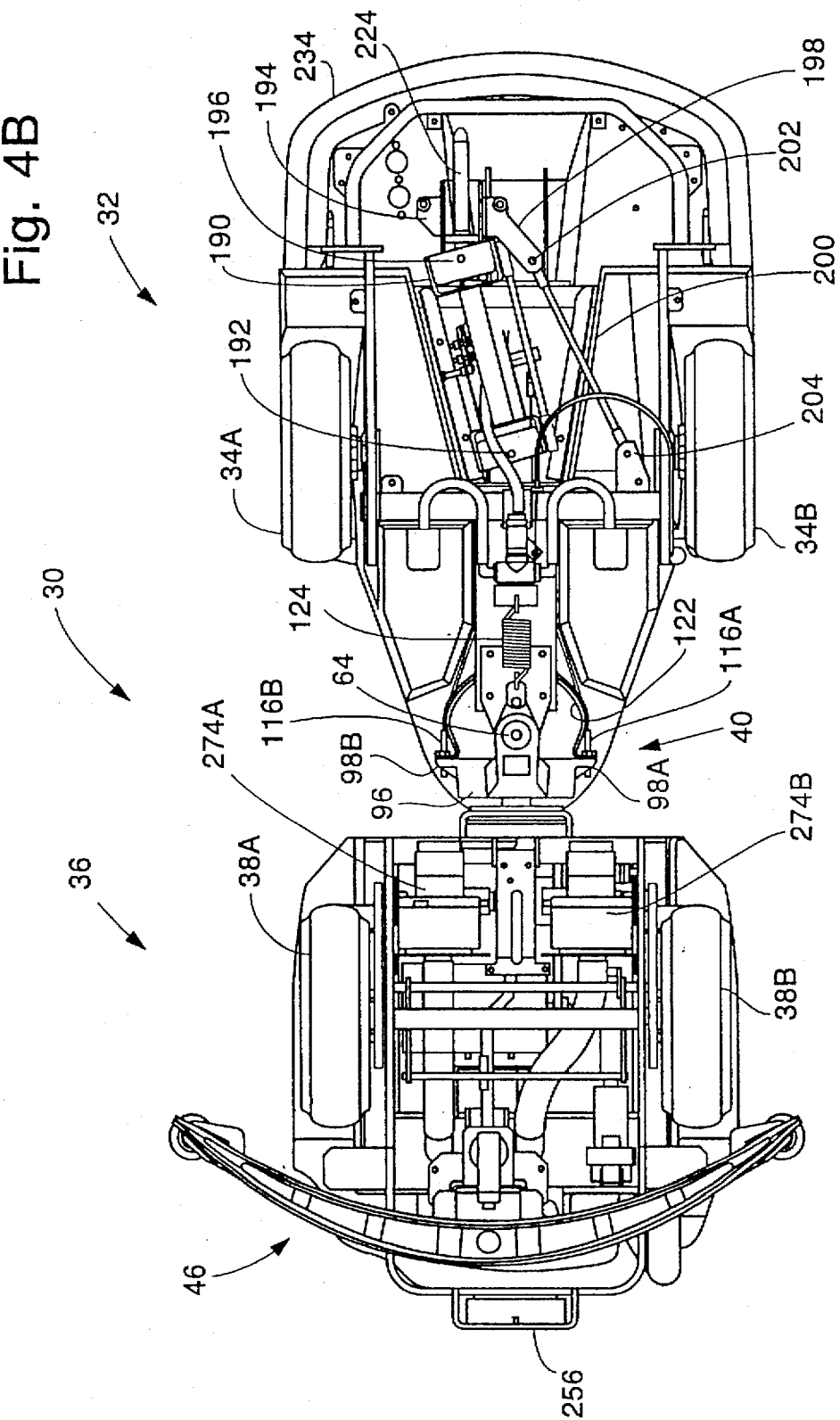
FIG. 4B is a bottom view of the floor scrubber of the present invention with the scrub head removed therefrom.

With reference to FIG. 4A, a spring 124 extends between the frame of the front portion 32 and an ear 126 extending from the yoke 90. During a turn, the spring 124 is stretched and serves, following the end of the turn, to apply a torque to the yoke 90 that tends to realign the front portion 32 with the rear portion 36 of the vehicle 30.

Notably, the steering system employed in the vehicle 30 avoids the use of hydraulic components. As a consequence, the steering system is also a safety feature. Specifically, the steering system will exert relatively little force on someone or something that becomes confined between the front portion 32 and the rear portion 36 during a turn compared to an articulated vehicle that uses hydraulics in the steering system. Relatedly, in such a situation, the front and rear portions 32, 36 can be readily separated. Further, the steering system is inexpensive to implement compared to a steering system that employs hydraulic componentry.

With reference to FIG. 8A, the steering column 102 is tiltable to facilitate entry and exit of an operator from the operator station 50. To implement the tiltable aspect, the steering column 102 is comprised of an upper steering column 130, a lower steering column 132, and a pivot joint 134 that pivotally connects the upper steering column 130 and the lower steering column 132. Adjustment of the angle of the upper steering column 130 is accomplished with an arm 136 that has one end thereof pivotally attached to a cover 138 and a second end with a pin 140 that is accessible to the operator and engages a notched bracket 142 that is attached to the upper steering column 130. The pin 140 is biased into the notched bracket via a spring 144. In operation, an operator moves the pin 140 downward to disengage the pin from the notched bracket, tilts the upper steering column 130 to the desired angle, and then releases the pin 140 so as to engage the notched bracket 142.

As previously mentioned, the application for the vehicle 30 has dictated certain dimensional constraints that impact the location and shape of several components, as well as the locations and orientations of one component of the vehicle to another component. In addition, the 60,000 to 120,000 square foot floor area to be serviced by the vehicle 30 has further dictated that the solution tank 42 have a capacity of 35–42 gallons and that the recovery tank 48 have a comparable capacity. Due to these dimensional and capacity restraints, the solution tank 42 is associated with the front portion 32 of the vehicle and the recovery tank 48 is associated with the rear portion 36 of the vehicle. The locations of the solution tank 42 and the recovery tank 48 could be reversed. However, since it is most desirable to have the scrub head 44 associated with the front portion 36 of the vehicle 30, association of the solution tank 42 with the front portion 32 simplifies the overall design of the vehicle 30.

With reference to FIGS. 9A–9C, the shape of the solution tank 42 is impacted by the dimensional and capacity requirements, as well as other factors. To elaborate, it is most desirable to desirable to associate the scrub head 44 with the front portion 32 of the vehicle 30. Relatedly, to facilitate monitoring of the scrub head 44, the operator station 50 is also associated with the front portion 32 of the vehicle 30. The dimensional aspects of the typical operator and of the scrub head 44 impose further constraints on the shape of the solution tank 42.

With the foregoing background in mind, the shape of the solution tank 42 has a number of characteristic features. Namely, the solution tank 42 includes a seat portion 48 with mounting slots 150 for the seat 52. The solution tank 42 further includes a floor portion 152 that forms a portion of the floor of the operator station 50. The floor portion 152 also includes floor mounting structures 154 that are used to attach a floor board 156 (see FIG. 1) on which the forward/reverse pedal 56 and other operator interface elements are mounted. Further characterizing the solution tank 42 are wheel well shaped portions 158A, 158B that respectively form wheel wells for the front pair of wheels 34A, 34B. The solution tank 42 is further characterized by a saddle bag shaped portion that has a first side portion 162, a second side portion 164, and a bridge portion 166 that extends between the first side portion 162 and the second side portion 164 and over a space 168 between the first and second side portions 162, 164. The space 168 primarily accommodates components of the steering system. It is also noteworthy that the lower half of the solution tank 42 is wider and provides the majority of the capacity relative to the top half of the solution tank 42. This, in turn, stabilizes the front portion 32 of the vehicle 30 by keeping most of the weight attributable to the cleaning solution relatively near to the floor. The solution tank 42 is also substantially symmetrical about the longitudinal plane of the front portion 32 of the vehicle 30. This also promotes stability by evenly distributing the cleaning solution retained in the solution tank 42 about the longitudinal axis of the front portion 32. It should also be noted that the solution tank 42 tapers from the front to the back where the seat portion 148 is located. This tapering facilitates the articulated steering of the vehicle by allowing the rear portion 36 to come, as illustrated in FIG. 7, very close to the front portion 32.

Filling of the solution tank 42 is accomplished via a filling port 170 located on the top of the seat portion 148. Cleaning solution is provided to the floor and/or scrub head 44 via first exit port 172 and second exit port 174 which are respectively associated with the lowest points of the first side portion 162 and second side portion 164 of the solution tank 42.

At this point, it should also be appreciated that the shape of the solution tank 42, articulated architecture, and dimensional aspects of the vehicle 30 provide a turning radius of 48–50 inches, which is the radius of the first arc 74 previously described with respect to FIG. 7.

A shock absorption system for the scrub head 44 that resulted from one or more of the previously discussed restraints is now discussed. By way of background, a scrub head includes a first end that typically extends outside of an area defined by the body of the vehicle so that an operator can monitor the operation of the scrub head relative to the floor being scrubbed. A second end of the scrub head generally underlies the vehicle. Typically, to avoid damaging the scrub head when a lateral force is applied to the exposed first end of the scrub head (typically by contact with a wall or similar structure), a shock absorbing system is employed to move the scrub head away from the object applying the force and then return the scrub head to its initial position when the force has dissipated.

Figure 10A:
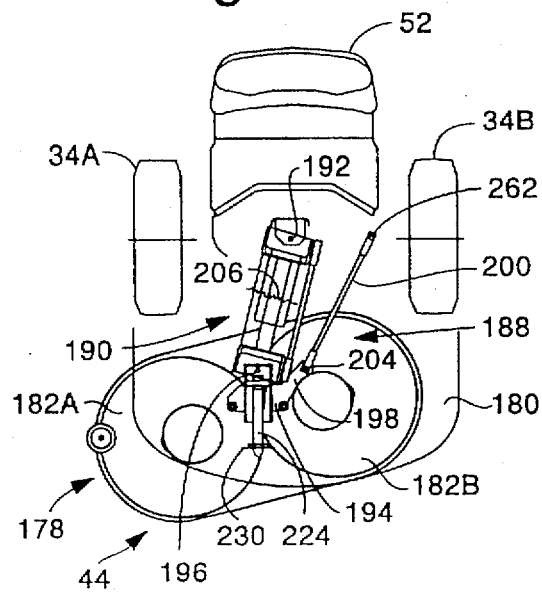
FIGS. 10A and 10B are free body illustrations of the mechanism used to absorb lateral shock forces applied to the scrub head.
Figure 10B:
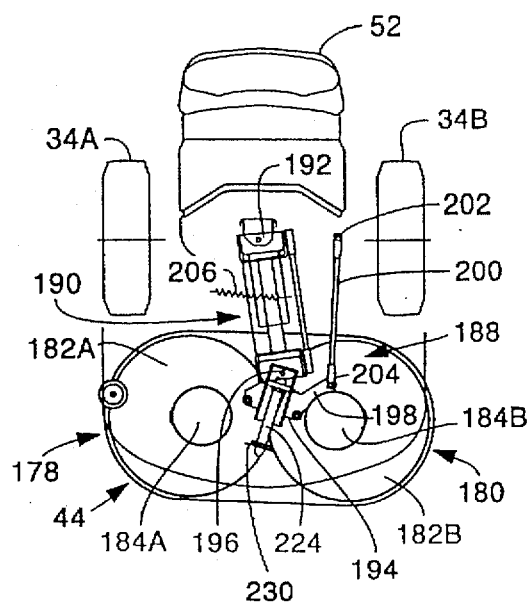

With reference to FIGS. 10A and 10B, the scrub head 44 includes a first end 178 that extends beyond an area defined by the body of the front portion 32 and a second end 180 that underlies the front portion 32. The scrub head further includes first and second brushes 182A, 182B that are respectively rotated by first and second motors 184A, 184B. To avoid creating a scrub line on the floor, the scrub head is disposed at an angle to the longitudinal axis of the front portion 32, thereby overlapping the areas scrubbed by the first and second brushes 182A, 182B. Due to one or more of the previously noted constraints, the second end 180 of the scrub head 44 is disposed adjacent to the front left wheel 34B.

A scrub head shock absorbing system 188 is provided to prevent the second end 180 of the scrub head 44 from contacting the front left wheel 34B. The system 188 includes a first bracket 190 having one end thereof pivotally attached to the frame of the front portion 32 at a first pivot point 192. The other end of the first bracket 190 is pivotally attached to a second bracket 194 at a second pivot point 196. The second bracket 194, in turn, is operatively connected to the scrub head 44. Also part of the second bracket 194 is an arm 198. Further comprising the shock absorbing system is a rod 200 having one end thereof pivotally attached to the frame of the front portion 32 at a third pivot point 202 and the other end thereof pivotally attached to the arm 198 at a fourth pivot point 204. A spring 206 with one end attached to the frame of the front portion 32 and another end attached to a point on the first bracket 190 between the first pivot point 192 and the second pivot point 196 is also included in the system 188.

The elements of the system 188 cooperate, in the absence of a lateral force being applied to the first end 178 of the scrub head 44, to hold the scrub head 44 in the position illustrated in FIG. 10A. When a lateral force is applied to the first end 178 of the scrub head 44, the first bracket 190 rotates to move the scrub head 44 away from the object applying the force to the scrub head 44. More importantly, the elements of the system 188 and, in particular the arm 198 and rod 200, move the scrub head 44 away from the wheel 34B by rotating the second bracket 194. Consequently, the system 188 operates to move the second end 180 of the scrub head 44 forward to avoid contacting the wheel 34B. The spring 206, which was elongated during rotation of the first bracket 190, operates upon dissipation of the lateral force to move the scrub head 44 from the orientation shown in FIG. 10B to the orientation shown in FIG. 10A.

Figure 11A:
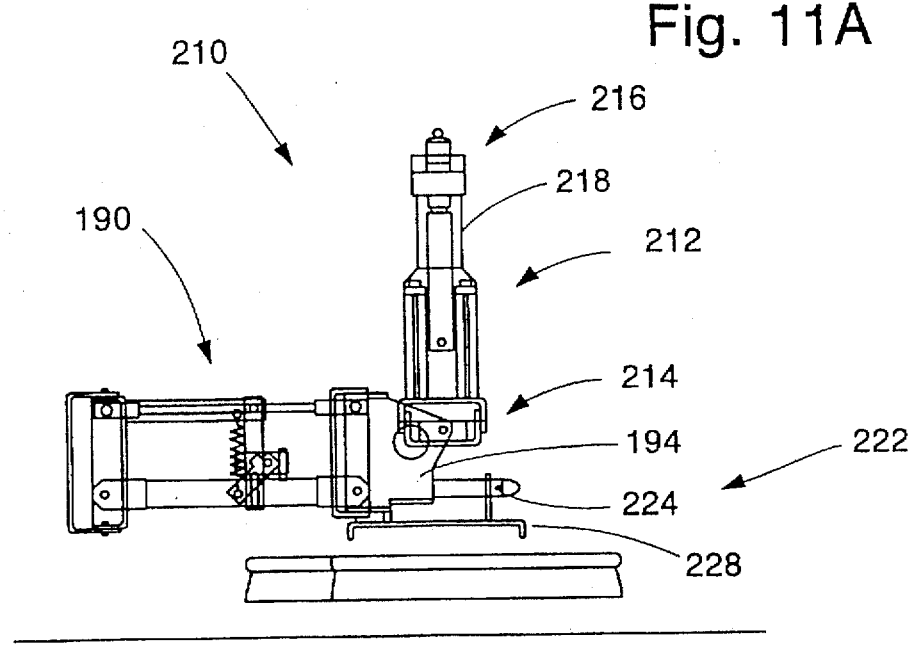
FIGS. 11A and 11B are side views of a free body diagram of the mechanism used to raise and lower the scrub head.
Figure 11B:
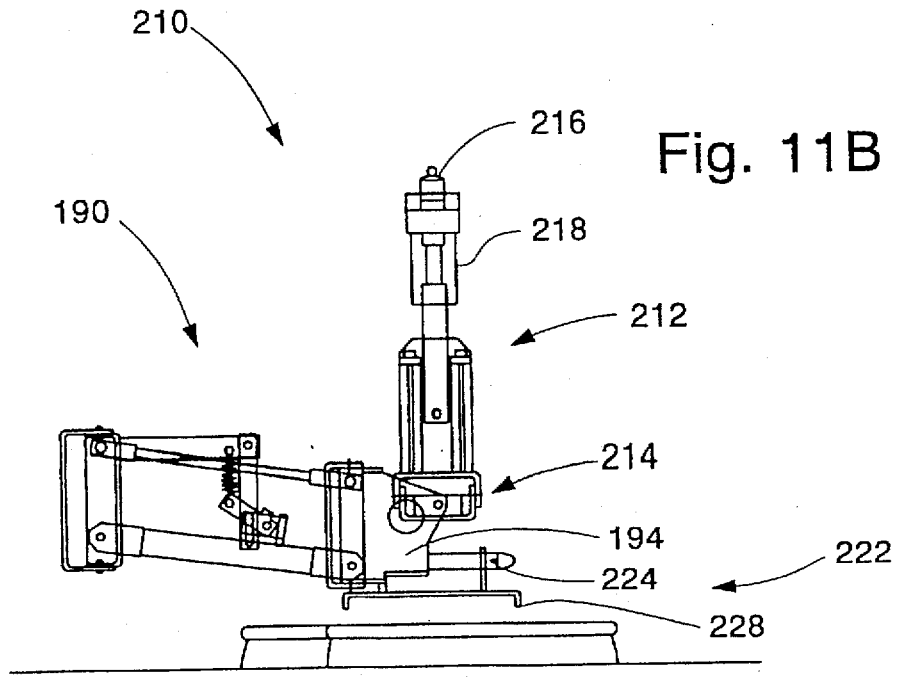

With reference to FIGS. 11A and 11B, a lift mechanism 210 for raising and lowering the scrub head 44 in cooperation with the scrub head shock absorbing system 188 is discussed. By way of background, the lift mechanism associated with a scrub head cannot be readily connected and disconnected from the vehicle during scrubbing operations when the scrub head may be subjected to a lateral force that makes use of a shock absorbing system. As a consequence, the lift mechanism 210 associated with the vehicle 30 is adapted to follow the path that the scrub head 44 follows when moved by the scrub head shock absorbing system 188 previously described.

Figure 12A:
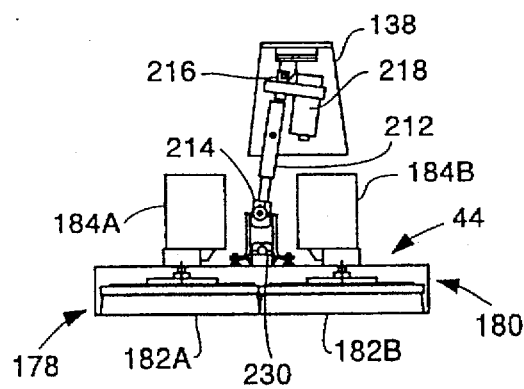
FIGS. 12A and 12B illustrate how the lift mechanism shown in FIGS. 11A and 11B accommodates lateral shocks applied to the scrub head as illustrated in FIGS. 10A and 10B.
Figure 12B:
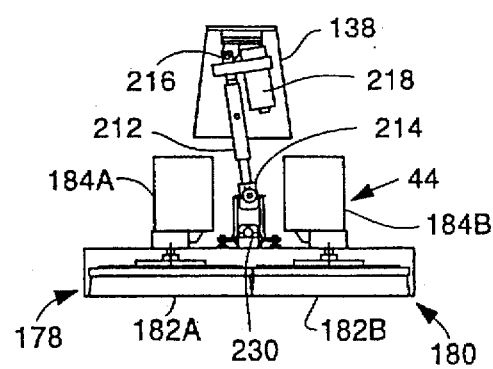

The lift mechanism 210 is comprised of the first bracket 190 which is, in turn, comprised of a four element pivoting parallelogram structure. The lift mechanism 210 further includes the second bracket 194 which, as previously mentioned, is attached to the first bracket 190 and retains the scrub head 44. Further included in the lift mechanism 210 is a screw and threaded bore structure 212 with one end of the threaded bore portion operatively connected to the second bracket 194 by a first gimbal 214. Likewise, one end of the screw portion of the structure 212 is connected to the cover 138 by a second gimbal 216. An actuator 218 is operatively connected to the screw portion of the structure 212 to raise and lower the scrub head 44 by applying the appropriate rotational power to the screw portion of the structure 212. The first and second gimbals 214, 216 permit the lift mechanism 210 to follow the path of the scrub head 44 when the scrub head shock absorption system 188 is responding to a lateral force applied to the scrub head. In this regard, FIGS. 12A and 12B respectively show the lift mechanism 210 in the absence of a lateral force being applied to the scrub head 44, as in FIG. 10A, and how the lift mechanism 210 rotates from right to left during application of a lateral force to the scrub head 44, as in FIG. 10B. A similar rotation of the lift mechanism 210 occurs forward and backward to follow the path of the scrub head during application of a lateral force.

With continuing reference to FIGS. 10A-12B, a mounting structure 222 that permits the operator to mount the scrub head 44 to, and dismount the scrub head 44 from the vehicle 30 substantially without the use of tools is discussed. Generally, the structure 222 includes a first mount that is associated with the frame of the vehicle, a second mount that is associated with the scrub head, and a latching mechanism that can be operated without the use of tools to connect and disconnect the scrub head 44. More specifically, the mounting structure 222 includes a cylindrical pin 224 that is operatively connected to the second bracket 194 and has a hole 226 extending through the tip thereof. The mounting structure 222 further includes a bracket 228 that is operatively attached to the scrub head 44 and has two, holed flanges for receiving the pin 224. A hairpin 230 that can be readily inserted and removed from the hole 226 in the pin 224 is used to connect and disconnect the bracket 228 from the pin 224. It should be appreciated that the locations of the pin and bracket can be reversed, i.e., the pin can be attached to the scrub head 44 and the bracket can be attached to the frame of the vehicle.

Connection or disconnection of a scrub head from the vehicle 30 commences with removal of a front bumper 234 to obtain access to the pin 224. The front bumper 234 is connected to the frame of the front portion 32 by a simple latch mechanism that is readily manipulated by an operator without the use of tools. If a scrub head is to be mounted, the scrub head 44 is placed in front of the pin 224 and the lift mechanism 210 is commanded, via the control panel 60, to place the pin 224 at a height appropriate for insertion through the holes associated with the bracket 228. At this point, the pin 224 can be inserted through the holes in the bracket 228 by simply driving the vehicle 30 forward. Once the pin has been inserted through the holes of the bracket 228, the hairpin 230 is inserted through the hole 226 to fix the scrub head 44 to the vehicle 30. Dismounting of the scrub head 44 merely involves reversal of the operations associated with mounting the scrub head 44.

It should be appreciated at this point that the mounting structure 222 permits an operator to readily use a number of different types of scrub heads. For instance, the illustrated scrub head can be interchanged with a burnisher head, a cylindrical scrub head, a scrub head with a greater width, a sweeper head, and a combination scrubber/sweeper head among others.

As previously mentioned, the constraints associated with the application require that the solution tank 42 be associated with the front portion 32 and the recovery tank 48 be associated with the rear portion 36.

The shape of the recovery tank is affected by the need to associate several of the remaining vehicle components with the rear portion 36 because the components already associated with the front portion and the dimensional constraints associated with the front portion prevent these components from also being associated with the front portion. Most significantly, the drive power system, less the interface portion thereof, is associated with the rear portion 36 of the vehicle 30. The shape of the recovery tank 48 is also affected by the previously noted capacity requirement as well as other factors.

With reference to FIGS. 13A-13E, the shape of the recovery tank 48 is discussed. Generally, the recovery tank 48 is a box-like structure that lacks a front and bottom side and defines an interior cavity 236 that accommodates at least a portion of the drive power system. More specifically, the recovery tank 48 includes a first side portion 238A, a second side portion 238B that is substantially parallel to the first side portion 238A, an end portion 240 and top portion 242 that each join the first and second side portions 238A, 238B. The recovery tank 48 is further characterized as having wheel well portions 244A, 244B that each serve, at least in part, to define wheel wells for the rear pair of wheels 38A, 38B. It should also be noted that the recovery tank 48 is substantially symmetrical about the longitudinal plane of the rear portion 36 of the vehicle 30. This promotes stability by evenly distributing the recovered cleaning solution retained in the recovery tank 48 about the longitudinal axis of the rear portion 36. Another feature of the recovery tank 48 are first and second cut-outs 246A, 246B that accommodate an operator's elbows during, for example, maximum articulations of the vehicle 30, as shown in FIG. 7. In addition, the exterior surfaces of the first and second side portions 238A, 238B of the recovery tank 48 are, as shown in FIG. 7, curved. More specifically, the curves of the exterior surfaces of the first and second side portions 238A, 238B are respectively concentric and interior to the first rear arc 82 and second rear arc 84. This assures that, during articulations of the vehicle 30, the exterior surfaces of the first and second side portions 238A, 238B follow the path of the sides of the front portion 32, thereby relieving the operator from having to worry whether the first and second side portions 238A, 238B hit any walls or other structures that the front portion 32 has avoided.

The recovery tank 48 further includes a drain port 250 (see FIG. 2) that is operatively connected to a drain hose 252. A first service port located on the top portion 242 of the recovery tank 48 provides access to the interface between the recovery tank 48 and the tubing or piping that transports cleaning fluid from the vacuum squeegee 46 to the recovery tank 48. A second service port 256 facilitates cleaning of the recovery tank and the like.

Figure 14B:
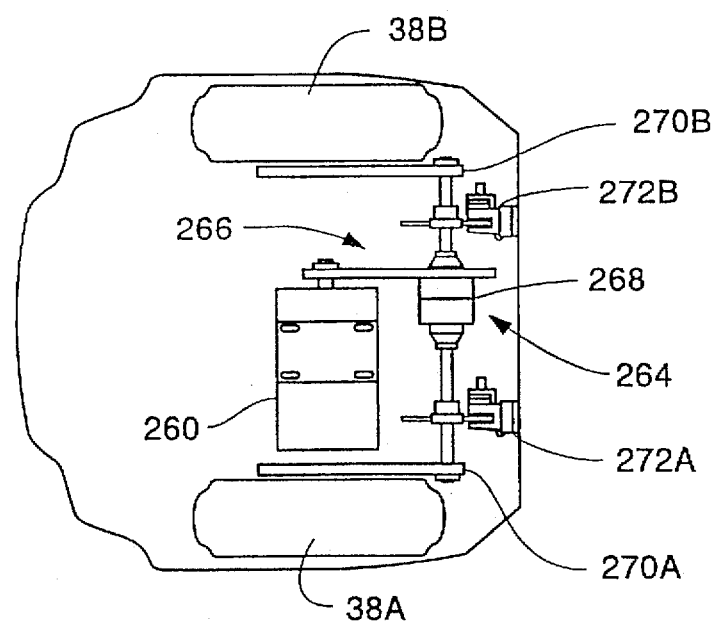

FIGS. 14A and 14B illustrate the positional relationships of the recovery tank 48 and components of the drive power system associated with the rear portion 36 to one another. Generally, the drive power systems components associated with the rear portion 36 include an electric motor 260, batteries 262 for providing electrical power to the electrical motor 260, and a drive linkage 264 for transmitting drive power from the electric motor 260 to the rear wheels 38A, 38B. One positional relationship of note is that the cavity 236 formed by the recovery tank 48 accommodates or houses the batteries 262. The batteries 262, in turn, have a positional relationship to the electric motor 260 and the drive linkage 264. Specifically, the batteries 262 are located above the electric motor 260 and drive linkage 264. As a consequence, the electric motor 260 and the drive linkage 264 are positioned very close to the rear wheels 38A, 38B. This provides for efficient transmission of power from the electric motor 260 to the wheels 38A, 38B because, due to the proximity of the electric motor 260 and drive linkage 264 to the wheels 238A, 238B, transmission losses associated with the drive linkage 264 are kept relatively low. In this regard, the drive linkage 264 is relatively simple and is comprised of a drive chain-sprocket system 266 that transmits rotational power from the motor 260 to a differential drive shaft 268. In turn, rotational power is transmitted from the differential drive shaft 268 to the rear wheels 38A, 38B by first and second wheel chain-sprocket assemblies 270A, 270B. Braking of the rear wheels 38A, 38B is achieved using first and second disk brakes 272A, 272B.

Also of note in FIG. 14A are first and second vacuum motors 274A, 274B that interface to the vacuum squeegee 46 and recovery tank 48.

Figure 15:
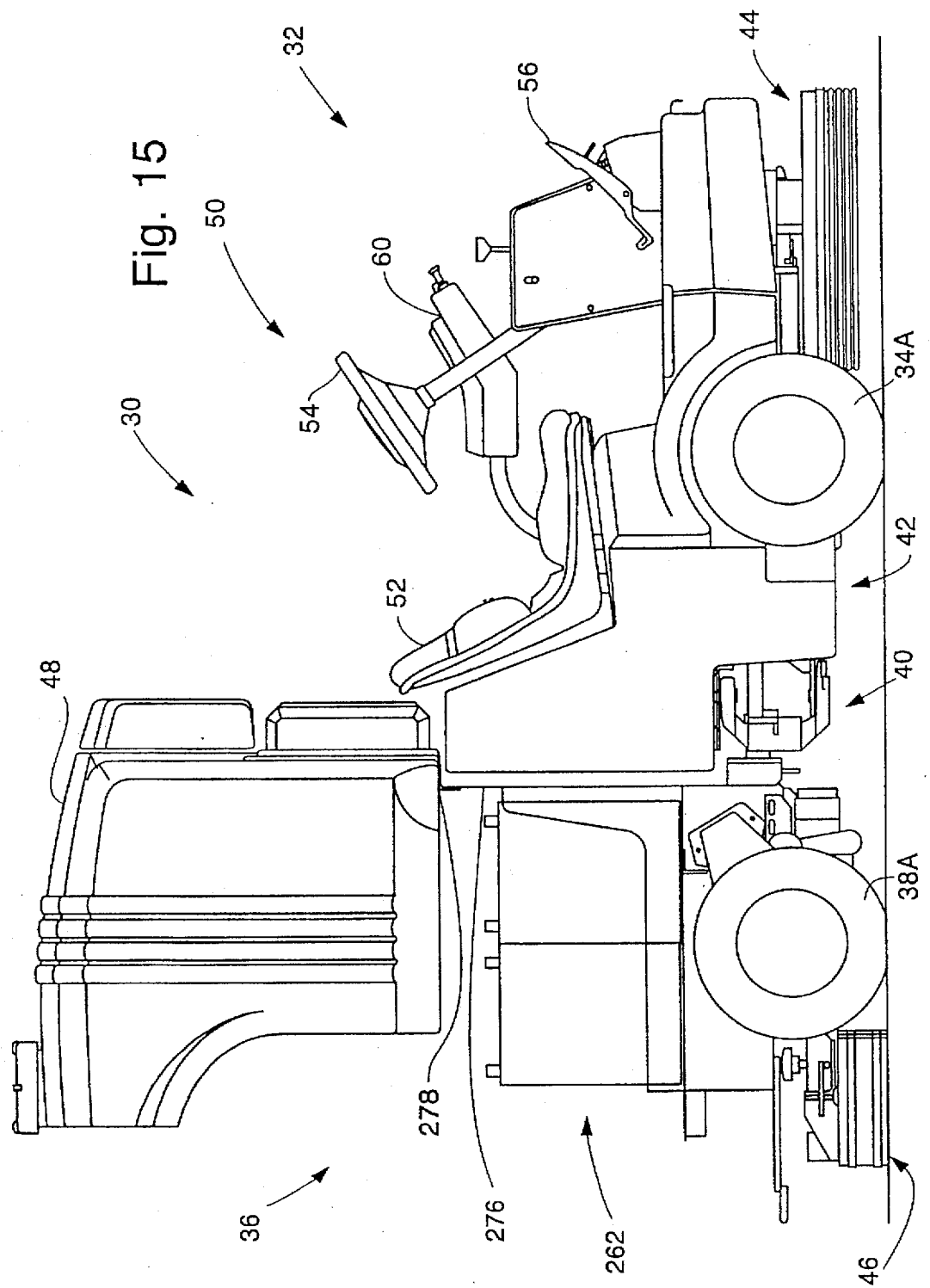
FIG. 15 illustrates how the recovery tank located on the rear portion of the articulated floor scrubber can be displaced to expose the electric motor and batteries for servicing.

With reference to FIG. 15, to facilitate recharging of the batteries 262 and other servicing of the electric motor 260, batteries 262 and drive linkage 264, the recovery tank 48 can be displaced to expose these components of the drive power system. Specifically, the recovery tank 48 is connected to a vertical panel 276 by a hinge 278 that permits the recovery tank 48, when substantially empty, to be displaced and servicing conducted.

The vacuum squeegee is also associated with the rear portion due to various features of the vehicle required to address the noted application. For instance, the vacuum squeegee is associated with the rear portion to facilitate transfer of cleaning solution to the recovery tank which is also associated with the rear portion based upon the constraints of the application, as previously noted. The vacuum squeegee is also associated with the rear portion and, more specifically, located behind the rear wheels so that the vehicle avoids leaving tire tracks during the scrubbing of a floor.

Association of the vacuum squeegee with the rear portion 36, the limitation of the width of the rear portion 36, and the width of the aisles in the noted application have impacted the vacuum squeegee 46. For instance, association of the vacuum squeegee 46 with the rear portion 36, due to the articulated steering architecture, requires that the vacuum squeegee remain in a fixed position during scrubbing operations. However, the ends of the vacuum squeegee must extend beyond the lateral bounds of the body of the rear portion 36 because the width of the rear portion 36 is constrained to be narrower than the width of the vacuum squeegee, which has a width that is slightly less than the width of the aisle in the application. As a consequence, the vacuum squeegee can be damaged by lateral shock forces.

With reference to FIGS. 16 and 17A–17C, a vacuum squeegee shock absorbing system 282 is discussed. The system 282 operates to hold the vacuum squeegee 46 in a fixed position in the absence of a lateral force being applied to one of the ends of the vacuum squeegee 46 that extends beyond the area defined by the body of the rear portion 36. The system 282 further operates, when a lateral force is applied to one of the ends, to permit the vacuum squeegee 46 to move and thereby absorb the lateral force. The system 282 includes a rod 284 with a first end thereof connected to the vacuum squeegee 46 and a second end thereof pivotally connected to the frame of the rear portion 36 at a pivot point 286. The system 282 further includes a notched block 288 that is connected to the frame of the rear portion 36 by a leaf spring 290. In the absence of a lateral force being applied to one of the ends of the vacuum squeegee 46, the notched rod 284 is retained by the notched block 288 and the vacuum squeegee 46 is held in the required fixed position. If, however, a lateral force is applied to one end of the vacuum squeegee 46, the leaf spring 290 permits the notched block 288 to be downwardly displaced and the rod 284 and vacuum squeegee 46 to rotate about the pivot point 286, thereby absorbing the force. Upon dissipation of the force, the vacuum squeegee 46 and the rod 284 rotate back towards the notched block 288 as the vehicle moves forward and eventually are captured by the notched block 288 to again hold the vacuum squeegee 46 in the requisite fixed position.

Figure 16:
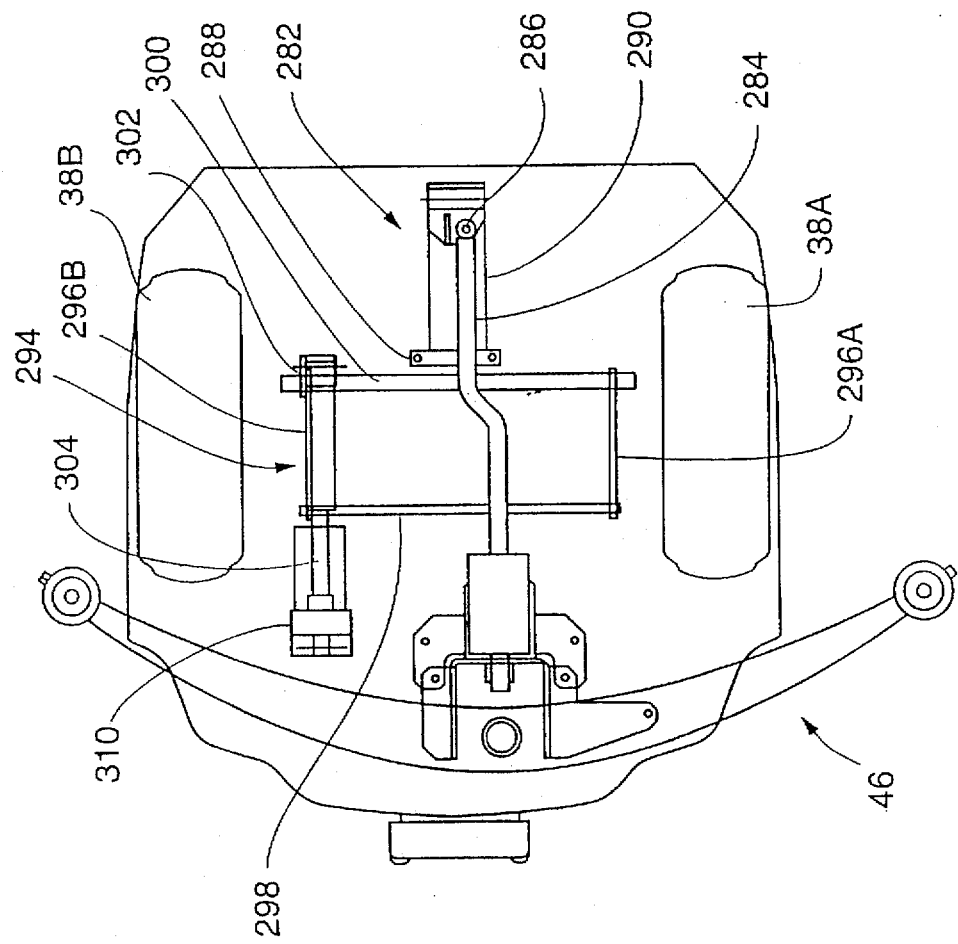
FIG. 16 is a top view of a free body diagram of the mechanism used to process lateral shock forces applied to the vacuum squeegee and the mechanism used to raise and lower the squeegee relative to the floor surface.

With reference to FIG. 16, 18A and 18B, a squeegee lift system 294 is provided that lifts the vacuum squeegee 46 regardless of whether the vacuum shock absorbing system 282 is holding the vacuum squeegee in the noted fixed position or permitting the vacuum squeegee 46 to "float" in response to a lateral force. Generally, the squeegee lift system uses a cam to lift the vacuum squeegee 46. In the preferred embodiment, the squeegee lift system 294 includes first and second arms 296A, 296B, a camming rod 298 that connects corresponding ends of the first and second arms 296A, 296B, an axle 300 connecting the other ends of the first and second arms 296A, 296B, a bracket 302 with one end rigidly connected to the second arm 296B, a screw and threaded bore structure 304 having one end pivotally connected to the bracket at pivot first point 306 and the other end pivotally connected to the frame of the rear portion 36 at second pivot point 308, and an actuator 310 for applying rotational force to the screw portion of the screw end threaded bore structure 304 to raise or lower the vacuum squeegee 46. Further included in the squeegee lift system 294 is the rod 284 previously utilized in the vacuum squeegee shock absorbing system 282, which is also pivotally connected to the frame of the rear portion 36 at third pivot point 312. An arm and spring structure 314 is operatively connected to the rod 284 so as to bias the vacuum squeegee against the floor during scrubbing operations.

Raising of the vacuum squeegee 48 is accomplished by using the actuator 310 to rotate the bracket 302, first and second arms 296A, 296B, and camming rod 298 about the axle 300. This causes the camming rod 298 to engage and rotate the rod 284 about the pivot point 312, thereby lifting the vacuum squeegee 46. To lower the vacuum squeegee 46, the lifting process is reversed. Notably, the lifting mechanism 294 operates regardless of whether the vacuum squeegee shock absorbing system 282 is holding the vacuum squeegee 46 in the noted fixed position or permitting the vacuum squeegee 46 to "float" in response to a lateral force.

The foregoing description of the invention has been presented for purposes of illustration and description. Further, the description is not intended to limit the inventions to the form disclosed herein. Consequently, variations and modifications commensurate with the above teachings, and the skill or knowledge in the relevant art are within the scope of the present invention. The preferred embodiments described herein are further intended to explain the best mode known for practicing the inventions and to enable others skilled in the art to utilize the inventions in various embodiments and with various modifications required by their particular applications or uses of the inventions. It is intended that the appended claims be construed to include alternate embodiments to the extent permitted by the prior art.

What is claimed is:

1. An articulated vehicle for cleaning a surface comprising:
   a front portion that includes a front exterior surface;
   a rear portion that includes a rear exterior surface;
   means for pivotally connecting said front portion and said rear portion;
   a front set of wheels, operatively connected to said front portion, for use in moving said front portion over a surface;
   a rear set of wheels, operatively connected to said rear portion, for use in moving said rear portion over a surface;
   wherein said front set of wheels are all of the surface contacting, locomotion related wheels associated with said front portion, all non-steerable, and all incapable of supporting said front portion for rolling movement over a surface if said front portion is disconnected from said rear portion;
   wherein said rear set of wheels are all of the surface contacting, locomotion related wheels associated with said rear portion, all non-steerable, and all incapable of supporting said rear portion for rolling movement over a surface if said rear portion is disconnected from said front portion;
   steering means, operatively connected to said means for pivotally connecting, for causing pivotal relative movement between said front portion and said rear portion about a pivot point;
   drive power means for applying rotational power to at least one wheel of said front and rear set of wheels;
   brake means for decreasing the rotational velocity of at least one wheel of said front and rear set of wheels;
   scrubbing means for scrubbing a surface as the vehicle moves over the surface; and
   an operator station, operatively associated with said front portion, for accommodating an operator on the vehicle;
   wherein said means for pivotally connecting includes an arm having a first arm end and a second arm end and in which said pivot point is located between said first arm end and said second arm end; and
   said means for steering includes a cable means having a first cable end operatively connected to said first arm end and a second cable end operatively connected to said second arm end.

2. An articulated vehicle, as claimed in claim 1, wherein said steering means comprises:
   a steering wheel;
   a steering column operatively connected to said steering wheel; and
   means for selectively tilting said steering column.

3. An articulated vehicle, as claimed in claim 1, wherein said drive power means comprises:
   an electric motor for providing rotational power to at least one wheel of said front and rear sets of wheels; and
   battery means for providing electrical power to said electrical motor.

4. An articulated vehicle, as claimed in claim 1, wherein:
   said break means includes a disk brake.

5. An articulated vehicle, as claimed in claim 1, wherein:
   said scrubbing means includes lift means for raising and lowering said scrub head;
   wherein said lift means includes means for pivoting about an axis during application of a lateral force to the scrub head.

6. An articulated vehicle, as claimed in claimed 1, wherein:
   said scrubbing means includes a recovery tank for use in retaining cleaning solution recovered from the surface.

7. An articulated vehicle, as claimed in claim 6, wherein:
   said recovery tank includes a side recovery tank portion and an end recovery tank portion.

8. An articulated vehicle, as claimed in claim 6, wherein:
   said recovery tank includes a side recovery tank portion and a top recovery tank portion.

9. An articulated vehicle, as claimed in claim 6, wherein:
   said recovery tank includes
   a first side recovery tank portion, an end recovery tank portion, and a second side recovery tank portion.

10. An articulate vehicle, as claimed in claim 1, wherein:
    said front and rear exterior surfaces have widths no greater than about 34 inches.

11. An articulated vehicle, as claimed in claim 1, wherein:
    said front exterior portion has a length that extends from a front surface thereof to said pivotal connection wherein said length is no greater than about 62 inches.

12. An articulated vehicle, as claimed in claim 11, wherein:
    said length is no greater than about 49 inches.

13. An articulated vehicle, as claimed in claim 1, wherein:
    said rear exterior portion has a length that extends from the rear surface thereof to said pivotal point connection, wherein said length is no greater than about 57 inches.

14. An articulated vehicle, as claimed in claim 13, wherein:
    said length is no greater than about 43 inches.

15. An articulated vehicle, as claimed in claim 1, wherein:
    said front set of wheels includes two wheels having a first common axis of rotation;
    said rear set of wheels includes two wheels having a second common axis of rotation;
    wherein, during a turn, said first and second common axes of rotation converge at an intersection point.

16. An articulated vehicle for cleaning a surface comprising:
    a front portion that includes a front exterior surface;

a rear portion that includes a rear exterior surface;

means for pivotally connecting said front portion and said rear portion that includes an arm having a first arm end and a second arm end;

a front set of wheels, operatively connected to said front portion, for use in moving said front portion over a surface;

a rear set of wheels, operatively connected to said rear portion, for use in moving said rear portion over a surface;

wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point and in which said pivot point is located between said first arm end and said second arm end;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle;

wherein said means for steering comprises:
  a steering wheel;
  a steering column operatively connected to said steering wheel; and
  cable means operatively connecting said steering column and said arm.

17. An articulated vehicle for cleaning a surface comprising:

a front portion that includes a front exterior surface;

a rear portion that includes a rear exterior surface;

means for pivotally connecting said front portion and said rear portion;

a front set of wheels, operatively connected to said front portion, for use in moving said front portion over a surface;

a rear set of wheels, operatively connected to said rear portion, for use in moving said rear portion over a surface;

wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle;

wherein said drive power means includes a motor for providing rotational power to at least one of said rear set of wheels; and wherein said motor is associated with said rear portion.

18. An articulated vehicle for cleaning a surface comprising:

a front portion that includes a front exterior surface;

a rear portion that includes a rear exterior surface;

means for pivotally connecting said front portion and said rear portion;

a front set of wheels, operatively connected to said front portion, for use in moving said front portion over a surface;

a rear set of wheels, operatively connected to said rear portion, for use in moving said rear portion over a surface;

wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle;

wherein said drive power means comprises:
  an electric motor for providing rotational power to at least one wheel of said rear set of wheels; and
  battery means for providing electrical power to said electric motor;
  wherein said electric motor is associated with said rear portion.

19. An articulate vehicle, as claimed in claim 18, wherein:
said battery means is associated with said rear portion.

20. An articulated vehicle, as claimed in claim 19, wherein:

said battery means is located above said electric motor relative to the surface.

21. An articulated vehicle for cleaning a surface comprising:

a front portion that includes a front exterior surface;

a rear portion that includes a rear exterior surface;

means for pivotally connecting said front portion and said rear portion;

a front set of wheels, operatively connected to said front portion, for use in moving said front portion over a surface;

a rear set of wheels, operatively connected to said rear portion, for use in moving said rear portion over a surface;

wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle;

wherein said brake means includes a braking actuator;

wherein said braking actuator is associated with said rear portion and provides a braking force to at least one of said rear set of wheels.

22. An articulated vehicle for cleaning a surface comprising:

a front portion that includes a front exterior surface;

a rear portion that includes a rear exterior surface;

means for pivotally connecting said front portion and said rear portion;

a front set of wheels, operatively connected to said front portion, for use in moving said front portion over a surface;

a rear set of wheels, operatively connected to said rear portion, for use in moving said rear portion over a surface;

wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle;

wherein said scrubbing means includes a solution tank for use in providing a cleaning solution for scrubbing the surface;

wherein said solution tank is associated with said front portion.

23. An articulated vehicle, as claimed in claim 22, wherein:

said operator station includes a seat; and said solution tank includes a seat shaped portion;

wherein said seat is operatively attached to said seat shaped portion of said solution tank.

24. An articulated vehicle, as claimed in claim 22, wherein:

said solution tank includes a wheel well shaped portion;

wherein at least one of said front set of wheels is at least partly surrounded by said wheel well shaped portion of said solution tank.

25. An articulated vehicle, as claimed in claim 22, wherein:

said solution tank includes a saddle bag shape portion with a first side portion, a second side portion, a bridge extending between said first and second side portion and overlaying a space between said first and second side portions.

26. An articulated vehicle for cleaning a surface comprising:

a front portion that includes a front exterior surface;

a rear portion that includes a rear exterior surface;

means for pivotally connecting said front portion and said rear portion;

a front set of wheels, operatively connected to said front portion, for use in moving said front portion over a surface;

a rear set of wheels, operatively connected to said rear portion, for use in moving said rear portion over a surface;

wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle;

wherein said scrubbing means comprises:
- a scrub head that, in the absence of a lateral force being applied thereto, is in a first position at which at least a portion of said scrub head extends outside an area defined by said front exterior surface; and
- shock means, responsive to a lateral force applied to said portion of said scrub head, for absorbing said lateral force by permitting said scrub head to move from said first position to a second position that is different from said first position and returning said scrub head from said second position to said first position after said lateral force is removed from said scrub head;

wherein said shock means includes means for rotating said scrub head about an axis that is substantially perpendicular to the surface.

27. An articulated vehicle, as claimed in claim 26, wherein said scrubbing means further comprises:
- lift means for raising and lowering said scrub head;
- wherein said lift means includes means for pivoting about an axis during application of said lateral force to said scrub head.

28. An articulated vehicle, as claimed in claim 27, wherein:
said means for pivoting includes a gimbal.

29. An articulated vehicle, as claimed in claim 28, wherein:
said means for pivoting includes a first gimbal and a second gimbal.

30. An articulated vehicle for cleaning a surface comprising:
- a front portion that includes a front exterior surface;
- a rear portion that includes a rear exterior surface;
- means for pivotally connecting said front portion and said rear portion;
- a front set of wheels, operatively connected to said front portion, for use in moving said front portion over a surface;
- a rear set of wheels, operatively connected to said rear portion, for use in moving said rear portion over a surface;
- wherein said front set of wheels are all of the surface contacting, locomotion related wheels associated with said front portion, all non-steerable, and all incapable of supporting said front portion for rolling movement over a surface if said front portion is disconnected from said rear portion;
- wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle;

wherein said scrubbing means comprises:
- a scrub head for scrubbing the surface; and
- means for permitting an operator to attach and detach said scrub head from the vehicle substantially without the use of tools.

31. An articulated vehicle, as claimed in claim 30, wherein said means for permitting comprises:
- a first mounting structure operatively attached to the vehicle;
- a second mounting structure operatively attached to said scrub head; and
- latch means, operable by an operator substantially without the use of tools, for selectively fixing said first mounting structure to said second mounting structure to at least partly place said scrub head in an operative position and to release said first mounting structure from said second mounting structure so said scrub head can be removed.

32. An articulated vehicle, as claimed in claim 30, wherein said means for permitting comprises:
- a rod having a free end and a fixed end operatively attached to one of the vehicle and said scrub head;
- a cylinder structure, operatively attached to the other of the vehicle and scrub head, for receiving said first end of said rod; and
- latch means, operable by an operator substantially without the use of tools, for selectively fixing said rod to said cylinder structure to at least partly place said scrub head in an operative position and to release said rod from said cylinder structure so that said scrub head can be removed.

33. An articulated vehicle, as claimed in claim 32, wherein:
said latch means includes a hair pin.

34. An articulated vehicle for cleaning a surface comprising:
- a front portion that includes a front exterior surface;
- a rear portion that includes a rear exterior surface;
- means for pivotally connecting said front portion and said rear portion;
- a front set of wheels, operatively connected to said front portion, for use in moving said front portion over a surface;
- a rear set of wheels, operatively connected to said rear portion, for use in moving said rear portion over a surface;
- wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle;

wherein said scrubbing means includes a recovery tank for use in retaining cleaning solution recovered from the surface;

wherein said recovery tank includes a first recovery tank portion and a second recovery tank portion that is separated from and substantially parallel to said first recovery tank portion.

35. An articulated vehicle for cleaning a surface comprising:

a front portion that includes a front exterior surface;

a rear portion that includes a rear exterior surface;

means for pivotally connecting said front portion and said rear portion;

a front set of wheels, operatively connected to said front portion, for use in moving said front portion over a surface;

a rear set of wheels, operatively connected to said rear portion, for use in moving said rear portion over a surface;

wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle;

wherein said scrubbing means includes a recovery tank for use in retaining cleaning solution recovered from the surface;

wherein said recovery tank has a shape so that the exterior of said recovery tank defines a cavity.

36. An articulated vehicle for cleaning a surface comprising:

a front portion that includes a front exterior surface;

a rear portion that includes a rear exterior surface;

means for pivotally connecting said front portion and said rear portion;

a front set of wheels, operatively connected to said front portion, for use in moving said front portion over a surface;

a rear set of wheels, operatively connected to said rear portion, for use in moving said rear portion over a surface;

wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle;

wherein said scrubbing means includes a vacuum squeegee for use in recovering fluid from the surface;

wherein said vacuum squeegee is associated with said rear portion.

37. An articulated vehicle for cleaning a surface comprising:

a front portion that includes a front exterior surface;

a rear portion that includes a rear exterior surface;

means for pivotally connecting said front portion and said rear portion;

a front set of wheels, operatively connected to said front portion, for use in moving said front portion over a surface;

a rear set of wheels, operatively connected to said rear portion, for use in moving said rear portion over a surface;

wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle;

wherein said scrubbing means comprises:

wherein said scrubbing means comprises:

a vacuum squeegee for use in removing cleaning solution from the surface and that, in the absence of a lateral force being applied thereto, has a portion that extends beyond an area defined by said rear exterior surface of said rear portion; and shock means, operatively attached to said vacuum squeegee, for retaining said vacuum squeegee in a first position in the absence of a lateral force being applied thereto and permitting said vacuum squeegee to move from said first position to a second position when a lateral shock force is applied to said vacuum squeegee.

38. An articulated vehicle, as claimed in claim 37, wherein said shock means comprises:

a rod having a first end operatively attached to said vacuum squeegee and a second end pivotally attached to another portion of said rear portion;

a block with a notch that accommodates said rod;

wherein, in the absence of a lateral force being applied to said squeegee, said rod resides in said notch;

wherein, during application of a lateral force to said vacuum squeegee, said rod is displaced from said notch.

39. An articulated vehicle, as claimed in claim 38, wherein said shock means further comprises:

spring means, attached to said block, to facilitate displacement of said rod from said notch during application of a lateral force to said vacuum squeegee.

40. An articulated vehicle for cleaning a surface comprising:

a front portion that includes a front exterior surface;

a rear portion that includes a rear exterior surface;

means for pivotally connecting said front portion and said rear portion;

a front set of wheels, operatively connected to said front portion, for use in moving said front portion over a surface;

a rear set of wheels, operatively connected to said rear portion, for use in moving said rear portion over a surface;

wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle;

wherein said scrubbing means comprises:

a vacuum squeegee for use in removing cleaning solution from the surface;

a rod having a first end attached to said vacuum squeegee and a second end attached to a portion of one of said front portion and said rear portion at a pivot point;

camming means having a camming surface for contacting said rod at a location between said first and second ends; and actuator means, operatively attached to said camming means, for causing said camming surface to engage said rod and thereby rotate said rod and said vacuum squeegee about said pivot point to displace said vacuum squeegee away from the surface.

41. An articulated vehicle for cleaning a surface comprising:

a front portion that includes a front exterior surface;

a rear portion that includes a rear exterior surface;

means for pivotally connecting said front portion and said rear portion;

a front set of wheels, operatively connected to said front portion, for use in moving said front portion over a surface;

a rear set of wheels, operatively connected to said rear portion, for use in moving said rear portion over a surface;

wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle;

wherein said scrubbing means includes a recovery tank for retaining cleaning solution recovered from the surface; and said drive means includes motor means for providing rotational power to at least one of said rear set of wheels;

wherein both said recovery tank and said motor means are associated with said rear portion.

42. An articulated vehicle, as claimed in claim 41, wherein:

at least a portion of said recovery tank is located above said motor means relative to the surface.

43. An articulated vehicle, as claimed in claim 41, wherein:

at least a portion of said recovery tank is located to a lateral side of said motor means.

44. An articulated vehicle, as claimed in claim 41, wherein:

said recovery tank is shaped so as to define a cavity; and said motor means is at least partly located in said cavity.

45. An articulated vehicle for cleaning a surface comprising:

a front portion that includes a front exterior surface;

a rear portion that includes a rear exterior surface;

means for pivotally connecting said front portion and said rear portion;

a front set of wheels, operatively connected to said front portion, for use in moving said front portion over a surface;

a rear set of wheels, operatively connected to said rear portion, for use in moving said rear portion over a surface;

wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle;

wherein said scrubbing means includes a recovery tank for retaining cleaning solution recovered from the surface; and said drive power means includes an electric motor and battery means for providing electrical power to said electric motor;

wherein said recovery tank is associated with said rear portion;

wherein said electric motor provides rotational power to at least one of said rear set of wheels.

46. An articulated vehicle, as claimed in claim 45, wherein:

said battery means is located above said motor means relative to the surface.

47. An articulated vehicle for cleaning a surface comprising:

a front portion that includes a front exterior surface;

a rear portion that includes a rear exterior surface;

means for pivotally connecting said front portion and said rear portion;

a front set of wheels, operatively connected to said front portion, for use in moving said front portion over a surface;

a rear set of wheels, operatively connected to said rear portion, for use in moving said rear portion over a surface;

wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface;

an operator station, operatively associated with said front portion, for accommodating an operator on the vehicle;

wherein said scrubbing means includes a recovery tank, associated with said rear portion, for retaining cleaning solution recovered from the surface;

said drive power means includes motor means, associated with said rear portion, for providing rotational power to at least one of said rear set of wheels;

wherein, during scrubbing operations, said recovery tank is in a first position that covers at least a portion of said motor means; and means for facilitating displacement of said recovery tank from said first position to a second position that is different from said first position and permits access to said portion of said motor means that is covered when said recovery tank is in said first position.

48. An articulate vehicle, as claimed in claim 47, wherein:

said means for facilitating includes a hinge.

49. An articulated vehicle for cleaning a surface comprising:

a front portion that includes a front exterior surface;

a rear portion that includes a rear exterior surface;

means for pivotally connecting said front portion and said rear portion;

a front set of wheels, operatively connected to said front portion, for use in moving said front portion over a surface;

a rear set of wheels, operatively connected to said rear portion, for use in moving said rear portion over a surface;

wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle;

wherein said rear exterior surface includes a front side surface, a backside surface, a first side surface extending from said front side surface to said backside surface, and a second side surface extending from said front side surface to said backside surface;

wherein at least one of said first and second side surfaces is curved.

50. An articulated vehicle for cleaning a surface comprising:

a front portion that includes a front exterior surface;

a rear portion that includes a rear exterior surface;

means for pivotally connecting said front portion and said rear portion;

a front set of wheels, operatively connected to said front portion, for use in moving said front portion over a surface;

a rear set of wheels, operatively connected to said rear portion, for use in moving said rear portion over a surface;

wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle;

wherein said operator station includes a seat; and said rear exterior surface includes a notch for accommodating an elbow of an operator located in said seat during turning of the vehicle.

51. An articulated vehicle for cleaning a surface comprising:

a front portion that includes a front exterior surface;

a rear portion that includes a rear exterior surface;

means for pivotally connecting said front portion and said rear portion;

a front set of wheels, operatively connected to said front portion, for use in moving said front portion over a surface;

a rear set of wheels, operatively connected to said rear portion, for use in moving said rear portion over a surface;

wherein said front set of wheels are all of the surface contacting, locomotion related wheels associated with said front portion and are all non-steerable;

wherein said rear set of wheels are all of the surface contacting, locomotion related wheels associated with said rear portion and are all non-steerable;

steering means, operatively connected to said means for pivotally connecting, for causing pivotal relative movement between said front portion and said rear portion;

drive power means for applying rotational power to at least one wheel of said front and rear set of wheels;

brake means for decreasing the rotational velocity of a t least one wheel of said front and rear set of wheels;

scrubbing means for scrubbing a surface as the vehicle moves over the surface;

an operator station, operatively associated with said front portion, for accommodating an operator residing on the vehicle;

wherein said scrubbing means includes a plurality of tanks including a solution tank for providing a cleaning solution for use in scrubbing the surface and a recovery tank for retaining cleaning solution recovered from the surface;

wherein said solution tank and said recovery tank are associated with different ones of said front portion and said rear portion.

52. An articulated vehicle, as claimed in claim 51, wherein:

said operator station includes a floor; and one of said plurality of tanks includes a floor portion that forms at least a portion of said floor of said operator station.

53. An articulated vehicle, as claimed in claim 51, wherein:

one of said plurality of tanks tapers from a wider portion to a narrow portion;

wherein said wider portion is located closer to the surface than said narrow portion.

54. An articulated vehicle, as claimed in claim 51, wherein:

said solution tank includes a first side portion with a first exit port for providing cleaning solution to the surface and a second side portion with a second exit port for providing cleaning solution to the surface;

wherein said first side portion and said second side portion are substantially symmetrical about a longitudinal plane of said front portion.

55. An articulated vehicle, as claimed in claim 51, wherein said scrubbing means comprises:

a scrub head that has a first end that extends outside an area defined by said front exterior surface and a second end that is located a first distance from a front surface of said front exterior surface;

shock means, responsive to a lateral force applied to said first end of said scrub head, for absorbing said lateral force by permitting said second end of said scrub head to move to a second distance from said front surface that is less than said first distance.

56. An articulate vehicle, as claimed in claim 51, wherein said scrubbing means comprises:

a scrub head;

lift means for raising and lowering said scrub head;

wherein said lift means includes means for pivoting about an axis during application of said lateral force to the scrub head.

57. An articulate vehicle, as claimed in claim 51, wherein:

one of said plurality of tanks has a shape so that the exterior of said one tank defines a cavity.

58. An articulated vehicle, as claimed in claim 51, wherein:

said scrubbing means includes a vacuum squeegee for use in recovering fluid from the surface;

wherein said vacuum squeegee is associated with said rear portion.

59. An articulated vehicle, as claimed in claim 51, wherein said scrubbing means comprises:

a vacuum squeegee for use in removing cleaning solution from the surface and that, in the absence of a lateral force being applied thereto, has a portion that extends beyond an area defined by said rear exterior surface of said rear portion; and shock means, operatively attached to said vacuum squeegee, for retaining said vacuum squeegee in a first position in the absence of a lateral force being applied thereto and permitting said vacuum squeegee to move from said first position to a second position that is different than said first position when a lateral force is applied to said vacuum squeegee.

60. An articulated vehicle, as claimed in claim 51, wherein:

said drive means includes motor means for providing rotational power to at least one of said rear set of wheels;

wherein said motor means is associated with said rear portion.

61. An articulated vehicle, as claimed in claim 60, wherein:

said one of said solution tank and said recovery tank that is associated with said rear portion is shaped so as to define a cavity; and said motor means is at least partly located in said cavity.

62. An articulated vehicle, as claimed in claim 51, wherein:

said drive power means includes an electric motor and battery means for providing electrical power to said electrical motor;

wherein said electric motor provides rotational power to at least one of said rear set of wheels.

63. An articulated vehicle, as claimed in claim 62, wherein:

said battery means is located above said motor means relative to the surface.

64. An articulated vehicle, as claimed in claim 51, wherein:

said front portion and said rear portion have a combined length of no greater than about 120 inches.

65. An articulated vehicle, as claimed in claim 64, wherein:

said combined length is no greater than about 93 inches.

66. An articulated vehicle, as claimed in claim 51, wherein:

said front and rear exterior surfaces have widths no greater than about 34 inches.

67. An articulated vehicle, as claimed in claim 51, wherein:

said rear exterior surface includes a front side surface, a backside surface, a first side surface extending from said front side surface to said backside surface, and a second side surface extending from said front side surface to said backside surface;

wherein at least one of said first and second side surfaces is curved.

68. An articulated vehicle, as claimed in claim 51, wherein:

said operator station includes a seat; and said rear exterior surface includes a notch for accommodating an elbow of an operator located in said seat during turning of the vehicle.

69. An articulated vehicle, as claimed in claim 51, wherein:

said drive means includes an electric motor and battery means for providing electrical power to said electrical motor;

wherein said battery means is associated with said rear portion.

70. An articulated vehicle, as claimed in claim 69, wherein:

said battery means is located between whichever of said solution tank and said recovery tank is associated with said front portion and at least a portion of whichever of said solution tank and said recovery tank is associated with said rear portion.

71. An articulated vehicle for cleaning a surface comprising:

a front portion that includes a front exterior surface;

a rear portion that includes a rear exterior surface;

means for pivotally connecting said front portion and said rear portion;

a front set of wheels, operatively connected to said front portion, for use in moving said front portion over a surface;

a rear set of wheels, operatively connected to said rear portion, for use in moving said rear portion over a surface;

wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle;

wherein said scrubbing means includes a recovery tank for retaining cleaning solution recovered from the surface; and said drive means includes an electric motor and battery means for providing electrical power to said electric motor;

wherein both said recovery tank and said battery means are associated with said rear portion.

72. An articulate vehicle, as claimed in claim 71, wherein: said battery means is located closer to said front portion of the vehicle than at least a portion of said recovery tank.

73. An articulated vehicle for cleaning a surface comprising:

a front portion that includes a front exterior surface and a solution tank;

a rear portion that includes a rear exterior surface;

means for pivotally connecting said front portion and said rear portion;

a front set of wheels, operatively connected to said front portion, for use in moving said front portion over a surface;

a rear set of wheels, operatively connected to said rear portion, for use in moving said rear portion over a surface;

wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion about a pivot point;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle;

wherein said front exterior surface includes a front leading surface, a front trailing surface, a front first side surface extending from said front leading surface to said front trailing surface, and a front second side surface extending from said front leading surface to said front trailing surface;

said rear exterior surface includes a rear leading surface, a rear trailing surface, a rear first side surface extending from said rear leading surface to said rear trailing surface, and a rear second side surface extending from said rear leading surface to said rear trailing surface;

wherein said front trailing surface has a first shape;

wherein said rear leading surface has a flat shape;

wherein during a turn of the articulated vehicle, a portion of said rear leading surface moves closer to a portion of said front trailing surface and a second portion of said rear leading surface moves away from a second portion of said front trailing surface.

74. An articulated vehicle, as claimed in claim 73, wherein:

said drive power means includes an electric motor and a battery means for providing electrical power to said electrical motor;

said scrubbing means includes a recovery tank for retaining cleaning solution recovered from the surface;

wherein said battery means is associated with said rear portion;

wherein said recovery tank is associated with said rear portion;

wherein said battery means is located between said rear leading surface and at least a portion of said recovery tank.

75. An articulated vehicle, as claimed in claim 73, wherein:

said drive power means includes an electric motor and a battery means for providing electrical power to said electrical motor;

wherein said battery means is associated with said rear portion and located immediately adjacent said rear leading surface of said rear exterior surface.

76. An articulated vehicle for cleaning a surface comprising:

a front portion that includes a front exterior surface, said front exterior surface having a width no greater than about 34 inches;

a rear portion that includes a rear exterior surface, said rear exterior surface having a width no greater than about 34 inches;

means for pivotally connecting said front portion and said rear portion, an articulated angle being defined when said front portion is pivoted relative to said rear portion and in which said articulated angle includes an angle of about 71°;

a front set of wheels, operatively connected to said front portion, for use in moving said front portion over a surface, said front set of wheels includes two wheels having a first common axis of rotation;

a rear set of wheels, operatively connected to said rear portion, for use in moving said rear portion over a surface, said rear set of wheels includes two wheels having a second common axis of rotation;

wherein, during a turn, said first and second common axes of rotation converge at an intersection point;

wherein a side surface of said rear exterior surface lies entirely within a radius from said intersection point having a length substantially equal to the width of an aisle and in which the width of the aisle is no greater than about 46 inches;

wherein said front set of wheels are all of the surface contacting, locomotion related wheels associated with said front portion, all non-steerable, and all incapable of supporting said front portion for rolling movement over a surface if said front portion is disconnected from said rear portion;

wherein said rear set of wheels are all of the surface contacting, locomotion related wheels associated with said rear portion, all non-steerable, and all incapable of supporting said rear portion for rolling movement over a surface if said rear portion is disconnected from said front portion;

steering means, operatively connected to said means for pivotally connecting, for causing pivotal relative movement between said front portion and said rear portion;

drive power means for applying rotational power to at least one wheel of said front and rear set of wheels;

brake means for decreasing the rotational velocity of at least one wheel of said front and rear set of wheels;

scrubbing means for scrubbing a surface as the vehicle moves over the surface; and an operator station, operatively associated with said front portion, for accommodating an operator on the vehicle.

* * * * *